(12) United States Patent
Kim et al.

(10) Patent No.: US 12,676,006 B2
(45) Date of Patent: Jul. 7, 2026

(54) APPARATUS AND METHOD FOR MONITORING ILLEGALLY PARKED/STOPPED VEHICLES

(71) Applicant: SK Planet Co., Ltd., Seongnam-si (KR)

(72) Inventors: Myung Jin Kim, Seongnam-si (KR); Yeong Hyeon Park, Suwon-si (KR)

(73) Assignee: SK Planet Co., Ltd., Seongnam-si (KR)

( * ) Notice: Subject to any disclaimer, the term of this patent is extended or adjusted under 35 U.S.C. 154(b) by 0 days.

(21) Appl. No.: 18/908,894

(22) Filed: Oct. 8, 2024

(65) Prior Publication Data

US 2025/0131730 A1 Apr. 24, 2025

(30) Foreign Application Priority Data

Oct. 18, 2023 (KR) ........................ 10-2023-0139928
Nov. 29, 2023 (KR) ........................ 10-2023-0170203

(51) Int. Cl.
| | |
|---|---|
| *G06V 20/54* | (2022.01) |
| *G05D 1/689* | (2024.01) |
| *G05D 101/00* | (2024.01) |
| *G05D 105/85* | (2024.01) |
| *G05D 107/13* | (2024.01) |
| *G06V 10/75* | (2022.01) |
(Continued)

(52) U.S. Cl.
CPC ............. *G06V 20/54* (2022.01); *G05D 1/689* (2024.01); *G06V 10/751* (2022.01); *G06V 20/625* (2022.01); *G08G 1/0175* (2013.01); *G08G 1/123* (2013.01); *H04N 7/181*

(2013.01); *G05D 2101/22* (2024.01); *G05D 2105/85* (2024.01); *G05D 2107/13* (2024.01); *G06V 2201/08* (2022.01)

(58) Field of Classification Search
CPC .... G06V 20/54; G06V 10/751; G06V 20/625; G06V 2201/08; G06V 20/52; G05D 1/689; G05D 2101/22; G05D 2105/85; G05D 2107/13; G05D 2109/10; G08G 1/0175; G08G 1/123; H04N 7/181
USPC ........................................................ 348/149
See application file for complete search history.

(56) References Cited

U.S. PATENT DOCUMENTS 10,817,814 B2 * 10/2020 Stefik ............. G06Q 10/063114
12,086,752 B2 * 9/2024 Khasis ................... G05D 1/227
(Continued)

*Primary Examiner* — John W Miller
*Assistant Examiner* — Omer Khalid
(74) *Attorney, Agent, or Firm* — WTA IP Law P.C.

(57) ABSTRACT

An apparatus and method for monitoring illegally parked/stopped vehicles using a movable camera device or a fixed camera device are provided. In an example of the monitoring method, the monitoring apparatus receives location information of a plurality of parking/stopping monitoring areas and generates a patrol route for a movable camera device to collect captured images based on the location information of the parking/stopping monitoring areas. The monitoring apparatus provides the patrol route to the movable camera device, receives, from the movable camera device, first captured images of the parking/stopping monitoring areas included in the patrol route and second captured images of the parking/stopping monitoring areas after a specified time has elapsed, and determines that a vehicle commonly detected in the first and second captured images is an illegally parked/stopped vehicle.

12 Claims, 10 Drawing Sheets

(51) Int. Cl.
　　G06V 20/62　　　(2022.01)
　　G08G 1/017　　　(2006.01)
　　G08G 1/123　　　(2006.01)
　　H04N 7/18　　　(2006.01)

(56)　　　　　　References Cited

U.S. PATENT DOCUMENTS

2009/0024430　A1 *　　1/2009　Marcus ............ G06Q 10/06375
　　　　　　　　　　　　　　　　　　　　705/7.34
2017/0372529　A1 *　12/2017　Gopalakrishnan ..... G07B 15/02

* cited by examiner

Figure 5:
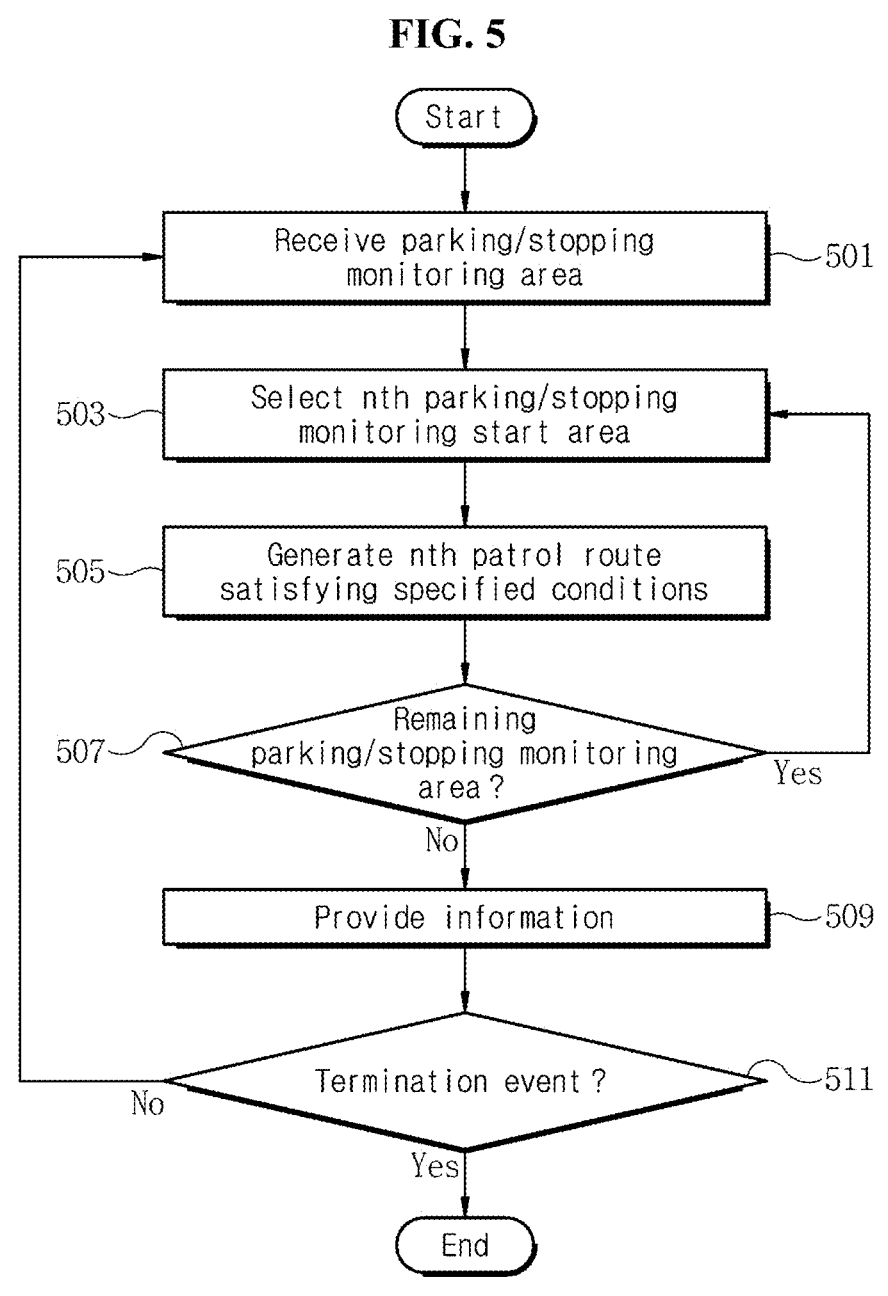

Start

Receive parking/stopping
monitoring area                          ~501

Select nth parking/stopping
monitoring start area          503~

Generate nth patrol route
satisfying specified conditions          505~

507~    Remaining
parking/stopping monitoring
area ?                                   Yes No Provide information          ~509

Termination event ?          ~511

No                Yes

End

FIG. 6

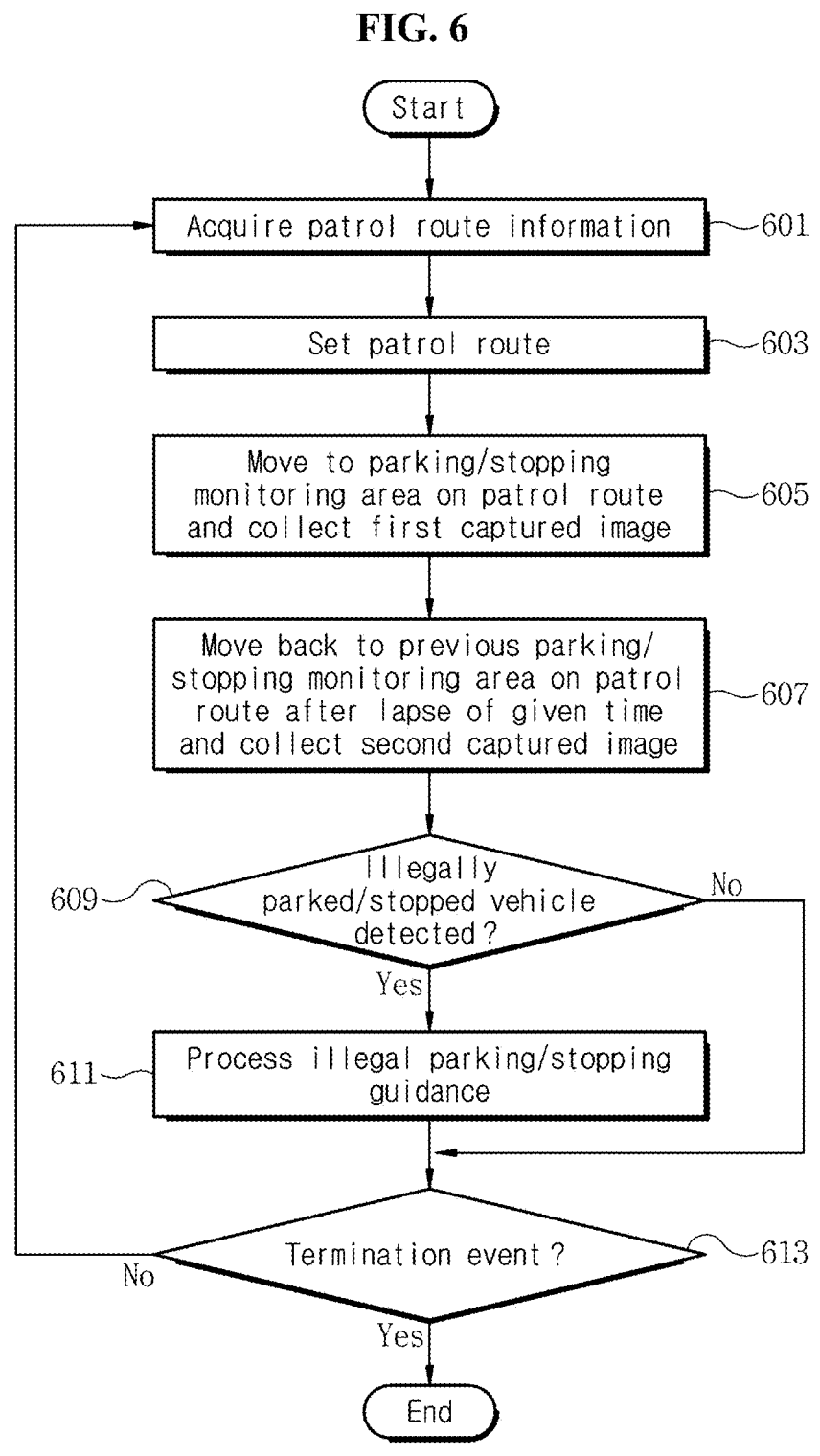

```
                    ┌─────────┐
                    │  Start  │
                    └─────────┘
                         │
                         ▼
        ┌──────────────────────────────────┐
        │  Acquire patrol route information │─── 601
        └──────────────────────────────────┘
                         │
                         ▼
        ┌──────────────────────────────────┐
        │          Set patrol route          │─── 603
        └──────────────────────────────────┘
                         │
                         ▼
        ┌──────────────────────────────────┐
        │  Move to parking/stopping          │
        │  monitoring area on patrol route   │─── 605
        │  and collect first captured image  │
        └──────────────────────────────────┘
                         │
                         ▼
        ┌──────────────────────────────────┐
        │  Move back to previous parking/    │
        │  stopping monitoring area on patrol│
        │  route after lapse of given time   │─── 607
        │  and collect second captured image │
        └──────────────────────────────────┘
                         │
                         ▼
              ◇─────────────────────◇
              │     Illegally        │         No
  609 ─────   │  parked/stopped vehicle │ ───────────┐
              │     detected?        │              │
              ◇─────────────────────◇              │
                         │ Yes                      │
                         ▼                          │
        ┌──────────────────────────────────┐        │
  611 ──│  Process illegal parking/stopping  │        │
        │            guidance                 │        │
        └──────────────────────────────────┘        │
                         │                          │
                         ▼◄─────────────────────────┘
              ◇─────────────────────◇
        No    │   Termination event?  │ ─── 613
     ┌────────│                       │
     │        ◇─────────────────────◇
     │                   │ Yes
     │                   ▼
     │              ┌─────────┐
     │              │   End   │
     │              └─────────┘
     └──────(back to 601)
```

<u>100</u>

200

210
Server communication circuit

250
Server processor

230
Server memory
Captured images — 232
Vehicle object information — 234
Object detection algorithm — 236
Area information — 238

240
Server display

Input unit
220

250

Image collector — 255
Object detector — 256
Parking/stopping violation decider — 257
Alarm processor — 258

APPARATUS AND METHOD FOR MONITORING ILLEGALLY PARKED/STOPPED VEHICLES

CROSS-REFERENCE TO RELATED APPLICATIONS

The present application is based upon and claims the benefit of priority to Korean Patent Application Nos. 10-2023-0139928, filed on Oct. 18, 2023, and 10-2023-0170203, filed on Nov. 29, 2023. The disclosures of the above-listed applications are herein incorporated by reference herein in their entirety.

TECHNICAL FIELD

The present disclosure generally relates to technology for detecting illegally parked/stopped vehicles, and more particularly, to an apparatus and method for monitoring illegally parked/stopped vehicles using a movable camera device or a fixed camera device.

BACKGROUND ART

In general, illegal parking is the act of parking a vehicle in a place where parking is prohibited by law. In addition, illegal stopping refers to a state of vehicle stopping other than parking, where a driver stops a vehicle in a prohibited area for less than a specified period of time (e.g. 5 minutes).

To crack down on such illegal parking and stopping, police directly patrol and unmanned surveillance cameras are being installed, but the effectiveness of the crackdown is low due to limited manpower and facilities.

SUMMARY

The present disclosure provides an illegally parked/stopped vehicle monitoring apparatus and method capable of efficiently detecting illegally parked/stopped vehicles using a movable camera device or a fixed camera device.

According to an embodiment of the present disclosure, an apparatus for monitoring illegally parked/stopped vehicles includes a server communication circuit and a server processor functionally connected to the server communication circuit. The server processor may be configured to receive location information of a plurality of parking/stopping monitoring areas, to generate a patrol route for a movable camera device to collect captured images based on the location information of the parking/stopping monitoring areas, to provide the patrol route to the movable camera device, to receive, from the movable camera device, first captured images of the parking/stopping monitoring areas included in the patrol route and second captured images of the parking/stopping monitoring areas after a specified time has elapsed, and to determine that a vehicle commonly detected in the first and second captured images is an illegally parked/stopped vehicle.

In the apparatus, the server processor may be configured to, in relation to generating the patrol route, identify a current location of the movable camera device and select the parking/stopping monitoring area closest to the current location of the movable camera device as a parking/stopping monitoring start area of the patrol route.

In the apparatus, the server processor may be configured to, in relation to generating the patrol route, add other parking/stopping monitoring area to the patrol route within the specified time that allows return to the parking/stopping monitoring start area after the first captured image is collected from the parking/stopping monitoring start area.

In the apparatus, the server processor may be configured to, if there is at least one remaining parking/stopping monitoring area that is not included in the patrol route among the plurality of parking/stopping monitoring areas, select a specific parking/stopping monitoring area from among the at least one remaining parking/stopping monitoring area and generate another patrol route that includes the specific parking/stopping monitoring area.

In the apparatus, the server processor may be configured to, in relation to generating the patrol route, group the plurality of parking/stopping monitoring areas according to a number of the movable camera devices.

In the apparatus, the specified time may include a maximum parking/stopping possible time set in the parking/stopping monitoring start area.

In the apparatus, the server processor may be configured to obtain a vehicle number of the vehicle from the first captured images when collecting the first captured images, to collect a phone number of a registered user terminal corresponding to the vehicle number, and to send a warning message regarding the illegally parked/stopped vehicle to the user terminal based on the phone number.

According to an embodiment of the present disclosure, a method for monitoring illegally parked/stopped vehicles is performed by a server processor of a monitoring apparatus. The method may include receiving location information of a plurality of parking/stopping monitoring areas; generating a patrol route for a movable camera device to collect captured images based on the location information of the parking/stopping monitoring areas; providing the patrol route to the movable camera device; receiving, from the movable camera device, first captured images of the parking/stopping monitoring areas included in the patrol route and second captured images of the parking/stopping monitoring areas after a specified time has elapsed; and determining that a vehicle commonly detected in the first and second captured images is an illegally parked/stopped vehicle.

In the method, generating the patrol route may include identifying a current location of the movable camera device; and selecting the parking/stopping monitoring area closest to the current location of the movable camera device as a parking/stopping monitoring start area of the patrol route.

In the method, generating the patrol route may include adding other parking/stopping monitoring area to the patrol route within the specified time that allows return to the parking/stopping monitoring start area after the first captured image is collected from the parking/stopping monitoring start area.

The method may further include checking whether there is at least one remaining parking/stopping monitoring area that is not included in the patrol route among the plurality of parking/stopping monitoring areas; if there is the at least one remaining parking/stopping monitoring area, selecting a specific parking/stopping monitoring area from among the at least one remaining parking/stopping monitoring area; and generating another patrol route that includes the specific parking/stopping monitoring area.

In the method, generating the patrol route may include grouping the plurality of parking/stopping monitoring areas according to a number of the movable camera devices.

In the method, the specified time may include a maximum parking/stopping possible time set in the parking/stopping monitoring start area.

The method may further include obtaining a vehicle number of the vehicle from the first captured images when collecting the first captured images; collecting a phone number of a registered user terminal corresponding to the vehicle number; and sending a warning message regarding the illegally parked/stopped vehicle to the user terminal based on the phone number.

According to an embodiment of the present disclosure, an apparatus for monitoring illegally parked/stopped vehicles includes a server communication circuit and a server processor functionally connected to the server communication circuit. The server processor may be configured to collect a stopped vehicle captured image of a vehicle stopped at a specific point in an illegal parking/stopping area, to run a predefined timer to check whether a specified time has elapsed, when the specified time has elapsed, to collect an exiting vehicle captured image of the vehicle exiting from an ending point of the illegal parking/stopping area, to acquire vehicle object information from each of the stopped vehicle captured image and the exiting vehicle captured image, to compare the vehicle object information of the stopped vehicle captured image and the vehicle object information of the exiting vehicle captured image, and if a vehicle with same vehicle object information exists, to determine the vehicle as an illegally parked/stopped vehicle.

In the apparatus, the vehicle object information may include at least two of exterior shape, color, and size of a vehicle.

In the apparatus, the server processor may be configured to provide area information including a location of the illegal parking/stopping area and an illegal parking/stopping monitoring time to at least one camera device.

In the apparatus, the server processor may be configured to mark the illegally parked/stopped vehicle when failing to obtain license plate information of the vehicle, and to obtain the license plate information of the vehicle when the marked vehicle exits the illegally parked/stopped area.

According to an embodiment of the present disclosure, an apparatus for monitoring illegally parked/stopped vehicles includes a server communication circuit and a server processor functionally connected to the server communication circuit. The server processor may be configured to collect an entering vehicle captured image of a vehicle entering a starting point of an illegal parking/stopping area, to collect an exiting vehicle captured image of the vehicle exiting from an ending point of the illegal parking/stopping area, to acquire vehicle object information from each of the entering vehicle captured image and the exiting vehicle captured image, and to determine the vehicle as an illegally parked/stopped vehicle if a time between a collection time of the entering vehicle captured image and a collection time of the exiting vehicle captured image exceeds a predefined time.

In the apparatus, the vehicle object information may include at least two of exterior shape, color, and size of a vehicle.

In the apparatus, the server processor may be configured to provide area information including a location of the illegal parking/stopping area and an illegal parking/stopping monitoring time to at least one camera device.

According to an embodiment of the present disclosure, a method for monitoring illegally parked/stopped vehicles is performed by a server processor of a monitoring apparatus. The method may include collecting a stopped vehicle captured image of a vehicle stopped at a specific point in an illegal parking/stopping area; running a predefined timer to check whether a specified time has elapsed; when the specified time has elapsed, collecting an exiting vehicle captured image of the vehicle exiting from an ending point of the illegal parking/stopping area; acquiring vehicle object information from each of the stopped vehicle captured image and the exiting vehicle captured image; comparing the vehicle object information of the stopped vehicle captured image and the vehicle object information of the exiting vehicle captured image; and if a vehicle with same vehicle object information exists, determining the vehicle as an illegally parked/stopped vehicle.

In the method, the vehicle object information may include at least two of exterior shape, color, and size of a vehicle.

The method may further include providing area information including a location of the illegal parking/stopping area and an illegal parking/stopping monitoring time to at least one camera device.

In the method, determining the vehicle as an illegally parked/stopped vehicle may include marking the illegally parked/stopped vehicle when failing to obtain license plate information of the vehicle, and obtaining the license plate information of the vehicle when the marked vehicle exits the illegally parked/stopped area.

According to an embodiment of the present disclosure, a method for monitoring illegally parked/stopped vehicles is performed by a server processor of a monitoring apparatus. The method may include collecting an entering vehicle captured image of a vehicle entering a starting point of an illegal parking/stopping area; collecting an exiting vehicle captured image of the vehicle exiting from an ending point of the illegal parking/stopping area; acquiring vehicle object information from each of the entering vehicle captured image and the exiting vehicle captured image; and determining the vehicle as an illegally parked/stopped vehicle if a time between a collection time of the entering vehicle captured image and a collection time of the exiting vehicle captured image exceeds a predefined time.

In the method, the vehicle object information may include at least two of exterior shape, color, and size of a vehicle.

The method may further include providing area information including a location of the illegal parking/stopping area and an illegal parking/stopping monitoring time to at least one camera device.

BRIEF DESCRIPTION OF DRAWINGS

FIG. 2 is a block diagram illustrating the configuration of a movable camera device according to the first embodiment of the present disclosure.

FIG. 5 is a flowchart illustrating an illegally parked/stopped vehicle monitoring method according to the first embodiment of the present disclosure.

FIG. 6 is a flowchart illustrating an operating method of a movable camera device in an illegally parked/stopped vehicle monitoring method according to the first embodiment of the present disclosure.

DETAILED DESCRIPTION

Figure 1:
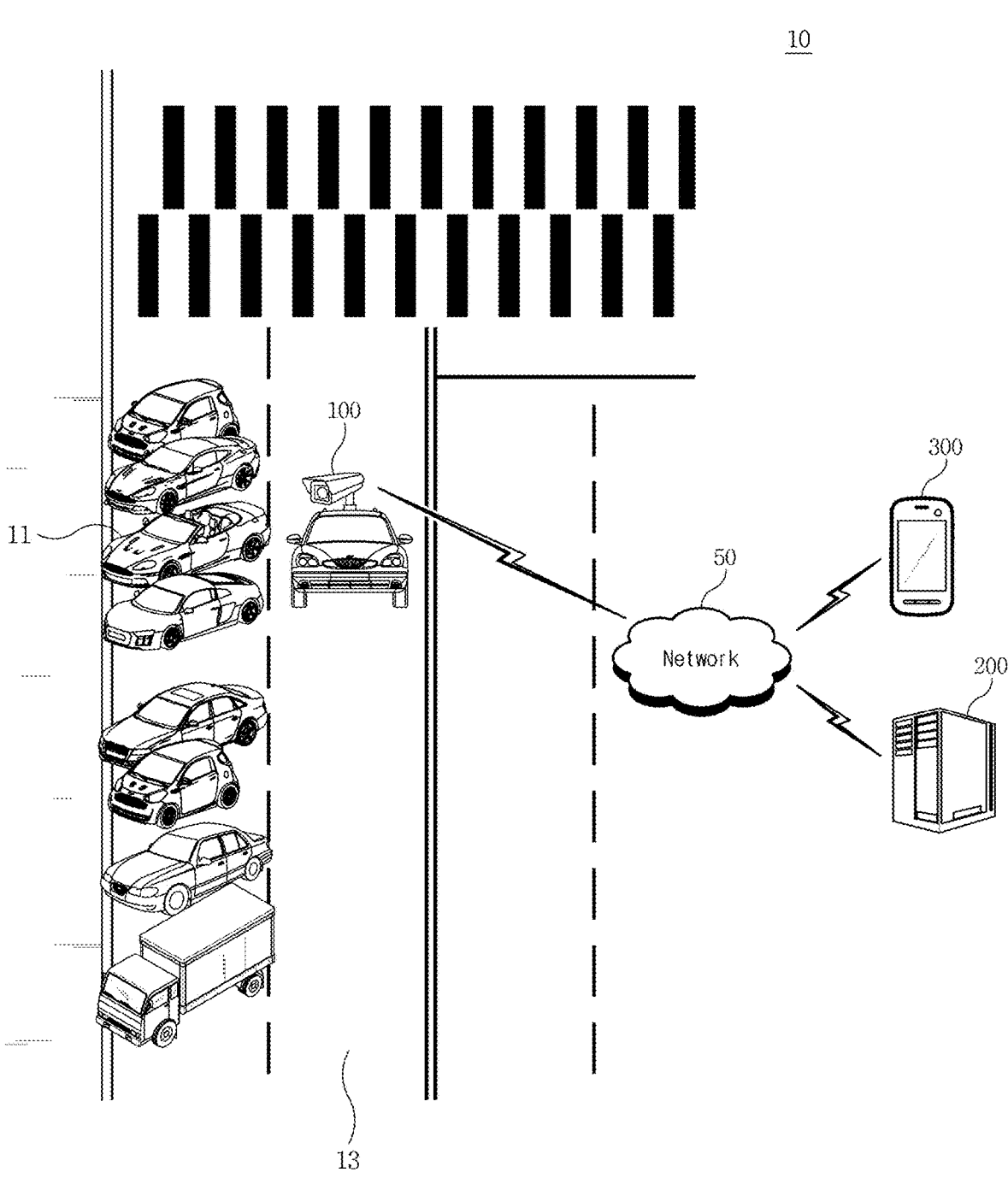
FIG. 1 is a schematic diagram illustrating an example of an illegally parked/stopped vehicle monitoring environment using a movable camera device according to the first embodiment of the present disclosure.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. Also, the terms "comprise", "include", "have", and derivatives thereof mean inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

In addition, the terms such as "unit" and "module" used herein refer to a unit that processes at least one function or operation and may be implemented with hardware, software, or a combination of hardware and software.

In addition, the terms "a", "an", "one", "the", and similar terms are used herein in the context of describing the present invention (especially in the context of the following claims)

may be used as both singular and plural meanings unless the context clearly indicates otherwise Also, embodiments within the scope of the present invention include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

In the description and claims, the term "network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the present invention may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like. The present invention may also be implemented in distributed system environments where both local and remote computer systems linked by a combination of wired data links, wireless data links, or wired and wireless data links through a network perform tasks. In such distributed system environments, program modules may be located in local and remote memory storage devices.

First Embodiment

Hereinafter, the first embodiment of the present disclosure will be described with reference to FIGS. 1 to 6.

FIG. 1 is a schematic diagram illustrating an example of an illegally parked/stopped vehicle monitoring environment using a movable camera device according to the first embodiment of the present disclosure.

Referring to FIG. 1, the monitoring environment 10 may include at least one movable camera device 100 for capturing images of at least one vehicle 11 parked/stopped on a road 13, a monitoring apparatus 200 (or a server device) connected to the movable camera device 100 via a network 50, a user terminal 300 of an administrator managing the road 13, and the network 50. Here, at least some of the above components of the monitoring environment 10 may be varied or omitted. For example, in the case where the movable camera device 100 includes a computing device corresponding to the monitoring apparatus 200, the monitoring apparatus 200 may be implemented in the movable camera device 100 and the network 50 may be omitted from the monitoring environment 10. Also, in a certain case, the user terminal 300 may be omitted from the monitoring environment 10.

The road 13 may have an area where the vehicle 11 can be legally parked/stopped and an illegal parking/stopping area where parking/stopping of the vehicle 11 is prohibited. The road 13 shown in FIG. 1 is only example, and the present disclosure is not limited to this example. The illegal parking/stopping area may be designated or changed variously depending on the country, region, type of road, day of the week, time, etc.

FIG. 1 shows a situation where a plurality of vehicles 11 are parked/stopped in an illegal parking/stopping area of the road 13. These parked/stopped vehicles 11 may be photographed by the movable camera device 100, and whether the vehicles 11 are illegally parked/stopped may be determined based on rules or conditions predetermined in the monitoring apparatus 200. The vehicle 11 may include a vehicle communication circuit and receive messages transmitted from a base station, satellite, or other electronic devices placed around the road 13 through a communication channel. For example, the vehicle 11 may receive a message related to illegal parking/stopping from at least one of the monitoring apparatus 200, the user terminal 300, and the movable camera device 100, and may output the received message to a vehicle output device (e.g., at least one of a vehicle display or a vehicle audio device).

The movable camera device 100 may be a vehicle equipped with a camera or a drone equipped with a camera. The movable camera device 100 may drive on a designated road under the control of the monitoring apparatus 200 (or according to a predefined patrol route) and, when it arrives at a designated parking/stopping monitoring area, may obtain a first captured image of that area. Then, after a predefined period of time has elapsed or after driving on a predefined section of the road, the movable camera device 100 may return to the parking/stopping monitoring area again and obtain a second captured image of that area. The first and second captured images may include captured images of a vehicle parked in the parking/stopping monitoring area from an angle at which the license plate of the vehicle can be identified. The first and second captured images may also include location information. The movable camera device 100 will be described in more detail below.

The monitoring apparatus 200 (or a server device) can receive captured images of the road 13 from the movable camera device 100 and detect illegally parked/stopped vehicles based on the received captured images. For example, the monitoring apparatus 200 can receive location information on at least one parking/stopping monitoring area, generate a patrol route for the movable camera device 100 to collect captured images, based on the received images, and provide the generated patrol route to the movable camera device 100. In addition, the monitoring apparatus 200 can receive a first captured image of a parking/stopping monitoring area included in the patrol route from the movable camera device 100 and, after a specified period of time, a second captured image of the parking/stopping monitoring area. In addition, the monitoring apparatus 200 can determine a vehicle commonly detected in the first and second captured images as an illegally parked/stopped vehicle. The monitoring apparatus 200 will be described in more detail below.

The user terminal 300 may be a terminal of an administrator managing the road 13 or a supervisor monitoring illegal parking/stopping. Additionally, the user terminal 300 may be a portable terminal carried by a driver of an illegally parked/stopped vehicle. The user terminal 300 may include a terminal communication circuit capable of communicating with the monitoring apparatus 200 via the network 50, a terminal display capable of outputting information or a message received from the monitoring apparatus 200, a terminal memory capable of storing the information or message received from the monitoring apparatus 200, and a terminal processor that controls the above components and operations of the user terminal 300. The user terminal 300 may receive information on an illegally parked/stopped vehicle or an illegal parking/stopping warning message from the monitoring apparatus 200 and may output the received information or message on the terminal display.

The network 50 may support the formation of a communication channel among the movable camera device 100, the monitoring apparatus 200, and the user terminal 300. The network 50 may include, for example, a communication element that supports a wired connection or a wireless connection between at least two of the movable camera device 100, the monitoring apparatus 200, and the user terminal 300. In an example, the network 50 may wirelessly connect between the movable camera device 100 and the monitoring apparatus 200 or between the monitoring apparatus 200 and the user terminal 300. In this regard, the network 50 may include at least one base station and a base station controller. The network 50 is not limited to a specific communication scheme (or communication generation), and may include communication equipment that supports at least one of various communication schemes for signal flow among the movable camera device 100, the monitoring apparatus 200, and the user terminal 300.

Figure 2:
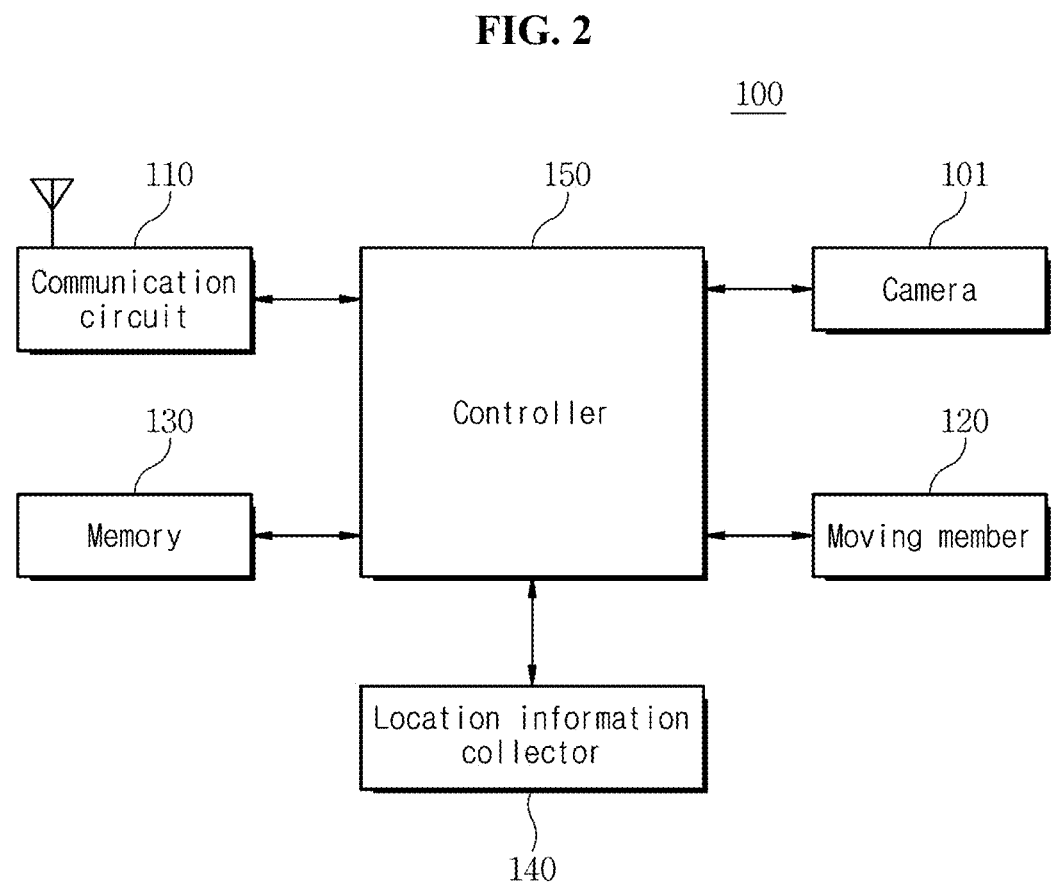

FIG. 2 is a block diagram illustrating the configuration of a movable camera device according to the first embodiment of the present disclosure.

Referring to FIG. 2, the movable camera device 100 of the first embodiment may include a camera 101, a communication circuit 110, a moving member 120, a memory 130, a location information collector 140, and a controller 150.

The camera 101 may include an image sensor or a CCTV camera that can be installed on the movable camera device 100. In addition, the camera 101 may have a zoom function. Additionally, the camera 101 may further include a module that can rotate. For example, the camera 101 may include a rotation module that can rotate the shooting direction up, down, left, and right. The camera 101 may capture a wide-area image of a designated parking/stopping monitoring area on the road 13 under the control of the controller 150 or may selectively capture an image of a specific vehicle located in the parking/stopping monitoring area. The camera 101 may capture still images and/or moving images of the parking/stopping monitoring area and/or a specific vehicle.

The communication circuit 110 may include at least one communication module for establishing a communication channel of the movable camera device 100. For example, the communication circuit 110 may include a communication module for a communication connection with the network 50. The communication circuit 110 may form a communication channel with the monitoring apparatus 200 via the network 50 and transmit images (e.g., the first and second captured images for the parking/stopping monitoring area) captured by the camera 101 to the monitoring apparatus 200 based on predefined schedule information or in response to the control of the controller 150. In addition, the communication circuit 110 may receive a control signal related to the movement control of the movable camera device 100 and a control signal for the shooting control of the camera 101 from the monitoring apparatus 200. In addition, the communication circuit 110 may receive patrol route (or shooting route) information for the parking/stopping monitoring area from the monitoring apparatus 200. In addition, the communication circuit 110 may transmit current location information of the movable camera device 100 to the monitoring apparatus 200 under the control of the controller 150.

The moving member 120 may include a device for moving the movable camera device 100. For example, if the movable camera device 100 is a drone equipped with the camera 101, the moving member 120 may include a plurality of propellers, a propeller driving motor, and a battery for supplying power to the motor. Alternatively, if the movable camera device 100 is a vehicle equipped with the camera 101, the moving member 120 may include a power generator that generates power through combustion, a plurality of wheels that rotate based on the generated power, and various components for controlling the speed/direction of the vehicle. The moving member 120 may move the movable camera device 100 to a designated parking/stopping monitoring area in response to the control of the controller 150. The designated parking/stopping monitoring area may be a fixed area or a variable area (e.g., an area where parking/stopping of a vehicle is changed to legal or illegal depending on time or settings).

The memory 130 may store data or a program related to the operation of the movable camera device 100. For example, the memory 130 may store at least one of information on at least one parking/stopping monitoring area provided by the monitoring apparatus 200, information on a patrol route for patrolling a plurality of parking/stopping monitoring areas, a first image captured in a specific parking/stopping monitoring area, a second image recaptured at the same parking/stopping monitoring area after a certain period of time has elapsed from the acquisition of the first captured image, and location information on the parking/stopping monitoring area(s). When there are a plurality of parking/stopping monitoring areas, the memory 130 may store the first captured image, the second captured image, and the location information as a single group for each monitoring area. The parking/stopping monitoring area may be changed (e.g., at least one of the locations, sizes, and number of monitoring areas is increased or decreased) depending on the setting of the monitoring apparatus 200.

The location information collector 140 may collect current location information of the movable camera device 100 under the control of the controller 150, and may store the collected location information in the memory 130 or provide the collected location information to the monitoring apparatus 200 through the communication circuit 110. In addition, the location information collector 140 may be activated upon receiving patrol route information from the monitoring apparatus 200 and then support the operation of the movable camera device 100 according to the patrol route. For example, the movable camera device 100 may be automatically operated according to the patrol route, in which case the location information collector 140 may collect current location information of the movable camera device 100 in real time.

The controller 150 can perform transmission and processing of signals related to the control of the movable camera device 100 and storage or transmission of the processing results. In an example, the controller 150 may receive information on the parking/stopping monitoring area or patrol route information by controlling the communication circuit 110 according to predefined scheduling information or in response to a request from the monitoring apparatus

200. The information on the parking/stopping monitoring area may include the locations, sizes, and number of parking/stopping monitoring areas, and may be pre-stored in the memory 130. The information on the parking/stopping monitoring area may be adjusted over time under the control of the monitoring apparatus 200 or according to manipulations of an administrator.

When the controller 150 receives the information on a certain parking/stopping monitoring area, it can control the moving member 120 to approach that area, and when a certain condition (e.g., approaching the parking/stopping monitoring area within a specific distance) is satisfied, it may activate the camera 101 to obtain a first captured image. The first captured image may include a still image or a moving image captured of the parking/stopping monitoring area. After obtaining the first captured image, the controller 150 may control the moving member 120 to leave the parking/stopping monitoring area. Thereafter, when the maximum parking/stopping possible time has elapsed, the controller 150 may control the moving member 120 to re-approach the parking/stopping monitoring area where the first captured image was obtained, and control the camera 101 to obtain a second captured image. The controller 150 may provide the obtained first captured image, second captured image, and location information to the monitoring apparatus 200 through the communication circuit 110.

Upon receiving the patrol route information, the controller 150 may control the movable camera device 100 to acquire captured images while patrolling a plurality of parking/stopping monitoring areas according to the patrol route. For example, when receiving the patrol route information including two parking/stopping monitoring areas, the controller 150 may control the movable camera device 100 to acquire a first captured image for a first parking/stopping monitoring area, then move to a second parking/stopping monitoring area, and acquire a first captured image for the second parking/stopping monitoring area. Then, after the maximum parking/stopping possible time in the first parking/stopping monitoring area has elapsed, the controller 150 may control the movable camera device 100 to move back to the first parking/stopping monitoring area, acquire a second captured image for the first parking/stopping monitoring area, and generate first group information (i.e., the first and second captured images and location information for the first parking/stopping monitoring area). Then, after the maximum parking/stopping possible time in the second parking/stopping monitoring area has elapsed, the controller 150 may control the movable camera device 100 to move back to the second parking/stopping monitoring area, acquire a second captured image for the second parking/stopping monitoring area, and generate second group information (i.e., the first and second captured images and location information for the second parking/stopping monitoring area). In addition, the controller 150 may provide the first group information and the second group information on the patrol route to the monitoring apparatus 200.

Meanwhile, in another example, the movable camera device 100 may determine whether there is an illegal parking/stopping vehicle by analyzing the captured images in addition to collecting the captured images of the parking/stopping surveillance area. In this regard, the movable camera device 100 may recognize license plates of vehicles included in the first and second captured images, and if the first and second captured images have the same license plate, the corresponding vehicle may be determined as an illegally parked/stopped vehicle.

Figures 3, 4:
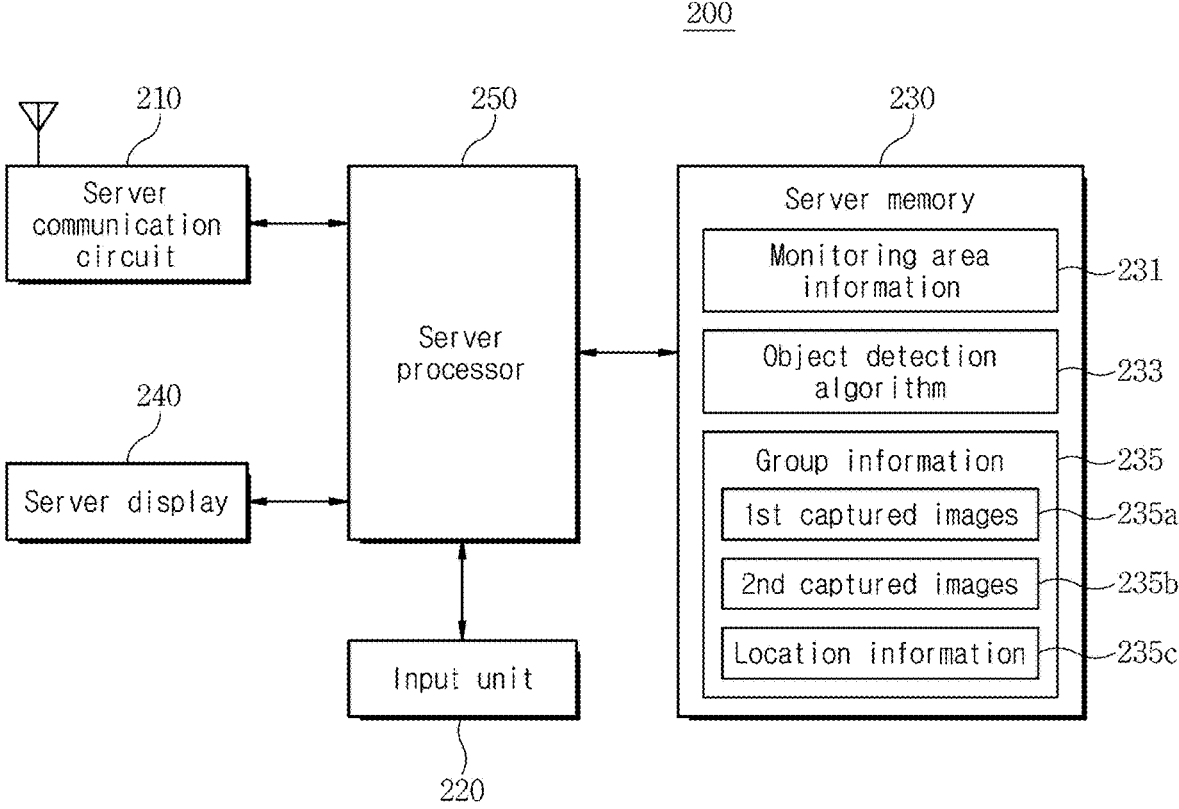
FIG. 3 is a block diagram illustrating the configuration of an illegally parked/stopped vehicle monitoring apparatus according to the first embodiment of the present disclosure.
FIG. 4 is a block diagram illustrating the configuration of a server processor in the monitoring apparatus illustrated in FIG. 3.

FIG. 3 is a block diagram illustrating the configuration of an illegally parked/stopped vehicle monitoring apparatus according to the first embodiment of the present disclosure.

Referring to FIG. 3, the monitoring apparatus 200 (or a server device) may include a server communication circuit 210, an input unit 220, a server memory 230, a server display 240, and a server processor 250. In the example of FIG. 3, the monitoring apparatus 200 is described as a separate component from the above-described movable camera device 100, but in another example, the monitoring apparatus 200 may be implemented as an integration with the movable camera device 100.

The server communication circuit 210 may support the formation of a communication channel of the monitoring apparatus 200. In an example, the server communication circuit 210 may include a first communication circuit capable of forming a communication channel with the movable camera device 100 through the network 50, and a second communication circuit capable of forming a communication channel with the user terminal 300 through the network 50. In the case where the server communication circuit 210 forms a communication channel with the movable camera device 100 and the user terminal 300 through the same type of communication scheme, the server communication circuit 210 may be configured as a single communication circuit. In an example, the server communication circuit 210 may receive captured images and location information from the movable camera device 100 in real time, at regular intervals, upon request, or when an illegally parked/stopped vehicle is found.

The input unit 220 may include components that support administrator's inputs related to the operation of the monitoring apparatus 200. For example, the input unit 220 may include at least one of various input devices such as a keyboard, a keypad, a mouse, a touchscreen, a touchpad, a touch key, a voice input device, a gesture input device, a joystick, and a wheel device. The input unit 220 may generate, in response to administrator's manipulation, at least one input signal from among an input signal requesting a communication connection with the movable camera device 100, an input signal inputting location information (or coordinate information) or a patrol route regarding at least one parking/stopping monitoring area provided to the movable camera device 100, an input signal requesting transmission of group information including a captured image and location information from the movable camera device 100 (this may be omitted when the movable camera device 100 is set to automatically transmit the captured image), an input signal requesting detection of an illegally parked/stopped vehicle from the received group information, an input signal indicating a warning when an illegally parked/stopped vehicle exists, and an input signal requesting output of a parking/stopping violation guide through the movable camera device 100. Then, the input unit 220 may transmit the generated input signal to the server processor 250.

The server memory 230 may store at least one of data and programs related to the operation of the monitoring apparatus 200. For example, the server memory 230 may store monitoring area information 231, object detection algorithm 233, and group information 235.

The monitoring area information 231 may include location information (e.g., coordinate information, in this case, latitude and longitude information, or latitude, longitude, and altitude information) of at least one parking/stopping monitoring area that the movable camera device 100 will photograph for parking/stopping monitoring. Additionally, the monitoring area information 231 may include information on the maximum parking/stopping possible time of the parking/stopping monitoring area. For example, the monitoring area information 231 may include time information on how long a parking/stopping violation will be detected if a vehicle is parked/stopped in a specific parking/stopping monitoring area, information on the time zone during which parking/stopping is possible in a specific parking/stopping monitoring area, etc. The monitoring area information 231 may be entered and stored by an administrator using the input unit 220. Additionally or alternatively, the monitoring area information 231 may be temporarily or semi-permanently stored according to a report of an illegally parked/stopped vehicle. Additionally or alternatively, the monitoring area information 231 may be pre-stored based on statistically frequent occurrences of illegal parking/stopping.

The object detection algorithm 233 may include an algorithm or program that can recognize and detect the vehicle 11 contained in the group information 235 (e.g., first captured images 235a, second captured images 235b, and location information 235c).

The group information 235 may include at least one of the first captured images 235a acquired in at least one parking/stopping monitoring area, the second captured images 235b acquired after a given time has elapsed for the corresponding parking/stopping monitoring area, and the location information 235c of a location where the first or second captured image was acquired.

The server display 240 may output at least one screen related to the operation of the monitoring apparatus 200. For example, the server display 240 may output at least one screen from among a screen indicating a connection status with the movable camera device 100, a screen indicating the current status of the movable camera device 100, a screen displaying information related to the movable camera device 100 currently operating, a screen displaying the group information 235 received in real time from the movable camera device 100, a screen displaying the vehicle 11 (or a license plate number of the vehicle) detected as a parking/stopping violation from the group information 235, and a screen displaying a warning to an illegally parked/stopped vehicle.

The server processor 250 may perform operations of receiving, transmitting, and processing signals related to the operation of the monitoring apparatus 200, and storing or transmitting the processing results. For example, the server processor 250 may control the server communication circuit 210 to receive the group information 235 from the movable camera device 100 based on predefined scheduling information or in response to an administrator's input, and analyze the received group information 235 to determine whether there is an illegally parked/stopped vehicle. Additionally, the server processor 250 may perform processing for a warning when an illegally parked/stopped vehicle is detected. In this regard, the server processor 250 may include a configuration as illustrated in FIG. 4.

FIG. 4 is a block diagram illustrating the configuration of a server processor in the monitoring apparatus illustrated in FIG. 3.

Referring to FIG. 4, the server processor 250 may include an image collector 251, a patrol route generator 252, a parking/stopping violation detector 253, and an alarm processor 254.

The image collector 251 may generate a control signal related to controlling the movable camera device 100 and transmit the generated control signal to the movable camera device 100 via the network 50. In an example, the image collector 251 may collect reports of parking/stopping violations, identify locations mentioned in the collected reports, map the identified locations on a map, and provide this information as the monitoring area information 231 to the movable camera device 100. Additionally or alternatively, the image collector 251 may divide a plurality of parking/ stopping monitoring areas selected as parking/stopping monitoring areas according to pre-stored scheduled information, and provide the monitoring area information 231 for each of the divided parking/stopping monitoring areas to each corresponding movable camera device 100. In an example, the image collector 251 may receive the current location information of the movable camera devices 100 and provide the monitoring area information 231 to the movable camera device 100 closest to each parking/stopping monitoring area.

In addition, when there are a plurality of parking/stopping monitoring areas, the image collector 251 may provide information on the plurality of parking/stopping monitoring areas to the patrol route generator 252. In this case, when the image collector 251 receives the patrol route information from the patrol route generator 252, it may provide the received patrol route information to the movable camera device 100. In addition, the image collector 251 may request the movable camera device 100 to provide the group information 235. In this case, when the image collector 251 receives the group information 235 from the movable camera device 100, it may temporarily or semi-permanently store the received group information 235 in the server memory 230.

When the patrol route generator 252 receives information on a plurality of parking/stopping monitoring areas from the image collector 251, it may generate an optimal patrol route based on the corresponding monitoring areas. For example, when the patrol route generator 252 receives location information (or coordinate information) of a plurality of parking/ stopping monitoring areas, it may calculate a distance between the corresponding parking/stopping monitoring areas and generate a shortest-distance patrol route. In addition, the patrol route generator 252 may generate an optimal patrol route based on information on the speed of the movable camera device 100, the distance between the parking/stopping monitoring areas, and the maximum parking/ stopping possible time for each of the parking/stopping monitoring areas.

Alternatively, when the patrol route generator 252 receives location information of a plurality of parking/ stopping monitoring areas, it may check the maximum parking/stopping possible time of each parking/stopping monitoring area, and generate a first patrol route by adding other parking/stopping monitoring area(s) based on the distance that after the first captured image collection for a specific parking/stopping monitoring area (i.e., parking/ stopping monitoring start area), allows return to the specific area in accordance with the maximum parking/stopping possible time of the specific area. In this case, the patrol route generator 252 may generate a second patrol route in the same manner for the remaining parking/stopping monitoring areas that are not included in the first patrol route. In the process of generating the first and second patrol routes, the patrol route generator 252 may select the parking/ stopping monitoring area that is closest to the current location of each of the movable camera devices 100 as the parking/stopping monitoring start area. Meanwhile, if the movable camera device 100 is single, the patrol route generator 252 may set the patrol route according to the order of received reports for the plurality of parking/stopping monitoring areas.

In another example, the patrol route generator 252 may generate patrol routes differently depending on road conditions. For example, after selecting the parking/stopping monitoring start area, the patrol route generator 252 may include other parking/stopping monitoring area(s) in the patrol route by considering the current road conditions so that it is possible to return to the parking/stopping monitoring start area according to its maximum parking/stopping possible time. In this regard, the patrol route generator 252 may receive road condition (e.g., traffic congestion on each road, traffic accidents, etc.) information from an external server device and apply the received road condition information to patrol route generation.

The parking/stopping violation detector 253 may perform object recognition on the group information 235 received from the movable camera device 100 and stored in the server memory 230 under the control of the image collector 251. In this regard, the parking/stopping violation detector 253 may call the object detection algorithm 233 stored in the server memory 230 and use the object detection algorithm 233 to check whether there is a vehicle commonly contained in the first captured image 235a and the second captured image 235b among the group information 235. For example, the parking/stopping violation detector 253 may collect license plate information of the vehicles included in the first and second captured images 235a and 235b and then compare the collected license plate information to check whether there is an identical license plate. If there is a vehicle commonly included, the vehicle may be determined to be an illegally parked/stopped vehicle.

The alarm processor 254 may receive information on illegally parked/stopped vehicles from the parking/stopping violation detector 253. If there is an illegally parked/stopped vehicle, the alarm processor 254 may create a message about the illegal parking/stopping and transmit it to the user terminal 300 (e.g., a user terminal of an administrator who manages the road 13). In an example, the alarm processor 254 may create a warning message about illegal parking/ stopping and transmit the warning message in a broadcast manner through a base station adjacent to the road 13 where the vehicle is parked/stopped. Alternatively, the alarm processor 254 may provide a warning message about an illegally parked/stopped vehicle to the movable camera device 100 so that the movable camera device 100 can output the warning message through an audio device or a display. Alternatively, the alarm processor 254 may collect the phone number of the user terminal 300 registered with the license plate number of the illegally parked/stopped vehicle recognized during the first captured image 235a collection process, and provide at least one of an illegal parking/stopping warning message, a ticket issuance guidance message for illegal parking/stopping, or an illegally parked/stopped vehicle towing guidance message to the corresponding phone number.

FIG. 5 is a flowchart illustrating an illegally parked/ stopped vehicle monitoring method according to the first embodiment of the present disclosure. The illegally parked/ stopped vehicle monitoring method illustrated in FIG. 5 can be performed by the server processor 250 of the monitoring apparatus 200.

Referring to FIG. 5, in step 501, the server processor 250 may receive parking/stopping monitoring area information. In this regard, the server processor 250 may perform an access to an external server device that provides the parking/ stopping monitoring area information. For example, the parking/stopping monitoring area may be selected by report reception. That is, when a vehicle occupant or a road pedestrian discovers an illegally parked/stopped vehicle on the road, he/she may photograph it and report it to the external server device. The server processor 250 may collect such reports from the external server device and integrate the reports at regular time intervals and classify them by area. In another example, information on the parking/stopping monitoring areas may be pre-stored in the server memory 230. In addition, this function of the external server device may be included in the monitoring apparatus 200.

Upon receiving the parking/stopping monitoring area information, the server processor 250 may select, in step 503, an nth parking/stopping monitoring start area for patrol route generation (here, 'n' is a natural number greater than or equal to 1). For example, when 'n' is 1 and the parking/stopping monitoring area information includes a plurality of parking/stopping monitoring areas, the server processor 250 may select a specific parking/stopping monitoring area as the first parking/stopping monitoring start area. At this time, the server processor 250 may select any parking/stopping monitoring area from among the plurality of parking/stopping monitoring areas as the first parking/stopping monitoring start area. Alternatively, the server processor 250 may collect location information of the movable camera device 100 and then select the parking/stopping monitoring area that is closest to the current location of the movable camera device 100 as the first parking/stopping monitoring start area. Alternatively, the server processor 250 may select the parking/stopping monitoring area that is reported first from among the parking/stopping monitoring areas as the first parking/stopping monitoring start area. Alternatively, the server processor 250 may select the parking/stopping monitoring area designated by the administrator (e.g., the area where illegally parked/stopped vehicles are most frequently found statistically or empirically) from among the parking/stopping monitoring areas as the first parking/stopping monitoring start area.

Next, in step 505, the server processor 250 may generate an nth patrol route satisfying a specified condition (here, 'n' is a natural number greater than or equal to 1). For example, the specified condition may be a maximum parking/stopping possible time (e.g., tens of seconds to several minutes) of the parking/stopping monitoring start area. For example, if 'n' is 1, after selecting the first parking/stopping monitoring start area, the server processor 250 may generate a first patrol route by adding other parking/stopping monitoring area(s) within a range that allows return to that start area according to the maximum parking/stopping possible time of the start area. In this process, if there is no other parking/stopping monitoring area satisfying the specified condition, the server processor 250 may generate the first patrol route using only the first parking/stopping monitoring start area.

After generating the nth patrol route, in step 507, the server processor 250 may check whether there are remaining parking/stopping monitoring area(s). If there are remaining parking/stopping monitoring area(s), the server processor 250 may return to the step 503 and perform selection of an n+1th parking/stopping monitoring start area and generation of an n+1th patrol route for the remaining parking/stopping monitoring area(s) that are not included in the nth patrol route. For example, if 'n' is 1 and there are remaining parking/stopping monitoring area(s), the server processor 250 may return to the step 503 and perform selection of a second parking/stopping monitoring start area and generation of a second patrol route for the remaining parking/stopping monitoring area(s) that are not included in the first patrol route.

If there are no remaining parking/stopping monitoring areas in the step 507, the server processor 250 may perform information provision in step 509. For example, the server processor 250 may provide at least one generated patrol route to at least one movable camera device 100.

Next, in step 511, the server processor 250 may check whether a termination event that terminates the patrol route generation has occurred. For example, when the illegal parking/stopping crackdown time has elapsed, the server processor 250 may determine that the termination event has occurred. Alternatively, when there is no report for a given time, the server processor 250 may determine that the termination event has occurred. In this case, the server processor 250 may resume from the step 501 after a certain period of time has elapsed or after a new report has been received. Alternatively, if there is new parking/stopping monitoring area information or a designated parking/stopping monitoring schedule has arrived, the server processor 250 may resume from the step 501.

Meanwhile, during the patrol route generation process, the server processor 250 may select a patrol route differently depending on the number of movable camera devices 100. For example, the server processor 250 may group the parking/stopping monitoring areas into predefined areas depending on the number of movable camera devices 100 that can operate the parking/stopping monitoring areas. For example, if there are three movable camera devices 100, the server processor 250 may group the parking/stopping monitoring areas into three groups. At this time, the server processor 250 may group the parking/stopping monitoring areas within a certain range based on the current locations of the movable camera devices 100. Alternatively, the server processor 250 may select the parking/stopping monitoring areas within a range that one movable camera device 100 can patrol within a specified time as a group corresponding to one patrol route.

FIG. 6 is a flowchart illustrating an operating method of a movable camera device in an illegally parked/stopped vehicle monitoring method according to the first embodiment of the present disclosure. The method illustrated in FIG. 6 can be performed by the controller 150 of the movable camera device 100.

Referring to FIG. 6, in step 601, the controller 150 may receive patrol route information. In this regard, the controller 150 may form a communication channel with the monitoring apparatus 200 and receive the patrol route information from the monitoring apparatus 200. Meanwhile, in the case where the movable camera device 100 receives a report on parking/stopping monitoring areas, the controller 150 may directly calculate the patrol route of the received parking/stopping monitoring areas. In this case, the step 601 becomes a patrol route information calculation step, not a patrol route information receiving step. In other words, the step 601 is a patrol route information acquisition step.

When the patrol route information is acquired, in step 603, the controller 150 may set the patrol route. For example, the controller 150 may register the patrol route in a navigation device installed in the movable camera device 100 and output it on a display installed in the movable camera device 100. If the movable camera device 100 is an autonomous vehicle, the controller 150 may register the patrol route as an autonomous driving course. If the movable camera device 100 is a drone, the controller 150 may register the patrol route as a drone movement course.

In step 605, the controller 150 may move to a parking/ stopping monitoring area along the patrol route and collect a first captured image. If the patrol route includes a plurality of parking/stopping monitoring areas, the controller 150 may collect the first captured image in each of the plurality of parking/stopping monitoring areas. In addition, the controller 150 may also collect location information where the first captured images are collected. In addition, the controller 150 may separately store location information about a location where there is an illegally parked/stopped vehicle.

In step 607, the controller 150 may move back to the previous parking/stopping monitoring area along the patrol route after a specified time (e.g., the maximum parking/ stopping possible time of the first parking/stopping monitoring area) has elapsed, and perform second captured image collection. If the patrol route includes a plurality of parking/ stopping monitoring areas, the controller 150 may collect second captured images from each of the plurality of parking/stopping monitoring areas again after a specified time has elapsed. In addition, the controller 150 may group the first and second captured images based on the location information to generate group information. At this time, the controller 150 may generate the group information based only on the location information of the location where the parked/stopped vehicle exists.

In step 609, through group information analysis, the controller 150 may determine whether an illegally parked/ stopped vehicle is detected. In this regard, the controller 150 may provide the group information to the monitoring apparatus 200 and receive information from the monitoring apparatus 200 on whether an illegally parked/stopped vehicle is detected.

If there is an illegally parked/stopped vehicle, the controller 150 may process an illegal parking/stopping guidance in step 611. For example, the controller 150 may provide guidance on illegal parking/stopping through an audio device or a display at a location where an illegally parked/ stopped vehicle is present. In addition, the controller 150 may notify of issuing a ticket or assigning penalty points due to illegal parking/stopping. Alternatively, the controller 150 may acquire a phone number of the user terminal corresponding to the license plate number of an illegally parked/ stopped vehicle and provide guidance on illegal parking/ stopping to the acquired phone number. If there is no illegally parked/stopped vehicle, the controller 150 may skip the step 611.

In step 613, the controller 150 may check whether an event related to the termination of illegal parking/stopping crackdown has occurred. If there is no occurrence of the termination event, the controller 150 may return to the step 601 and re-perform the subsequent operations. The termination event may be, for example, the lapse of illegal parking/stopping crackdown time, the receipt of an administrator's instruction requesting the termination of illegal parking/stopping crackdown, the absence of receipt of patrol route information within a specified time, etc. Thereafter, the controller 150 may resume from the step 601 when a specified condition is met (e.g., the lapse of a specified time, the arrival of a schedule).

Second Embodiment

Hereinafter, the second embodiment of the present disclosure will be described with reference to FIGS. 7 to 12.

Figure 7:
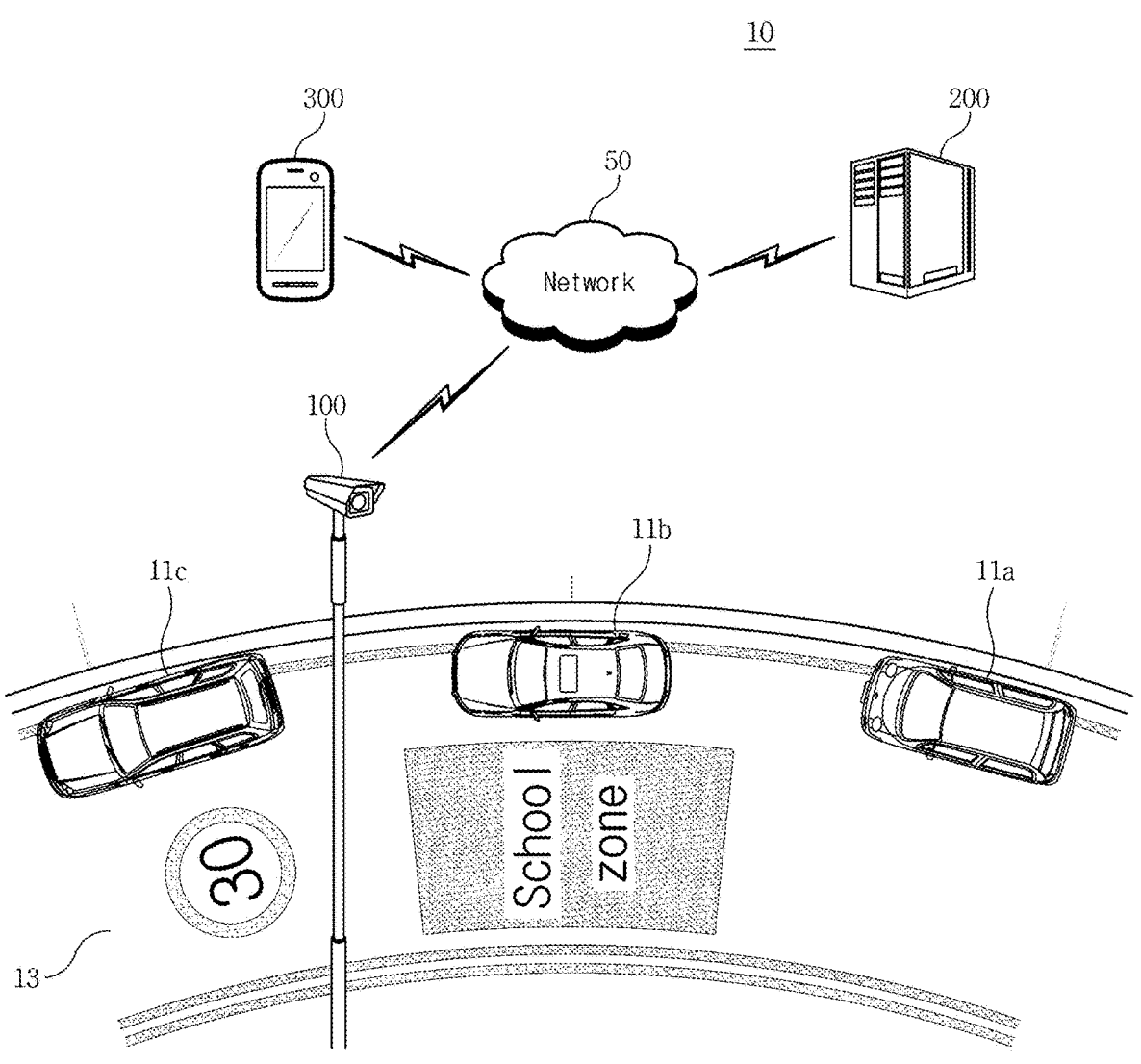
FIG. 7 is a schematic diagram illustrating an example of an illegally parked/stopped vehicle monitoring environment according to the second embodiment of the present disclosure.

FIG. 7 is a schematic diagram illustrating an example of an illegally parked/stopped vehicle monitoring environment according to the second embodiment of the present disclosure.

The monitoring environment 10 shown in FIG. 7 may include at least one vehicle 11*a*, 11*b* and/or 11*c* parked/ stopped on a road 13, at least one camera device 100 (e.g., a CCTV camera or a camera-mounted vehicle) capable of photographing the road 13, a network 50, a monitoring apparatus 200, and a user terminal 300. The monitoring environment 10 shown in FIG. 7 is similar to the monitoring environment 10 shown in FIG. 1. However, the camera device 100 shown in FIG. 7 is different in that it may be a fixed camera device such as a CCTV camera in addition to the movable camera device 100 shown in FIG. 1. The fixed camera device merely indicates a camera device with a fixed location and does not mean that the shooting direction is fixed. Even the fixed camera device may have multiple shooting directions by rotating at predetermined time intervals.

The road 13 may have an area where the vehicles 11*a*, 11*b* and 11*c* may legally park/stop, and an illegal parking/ stopping area where parking/stopping of the vehicles 11*a*, 11*b* and 11*c* is prohibited. Since the road 13 and the vehicles 11*a*, 11*b*, and 11*c* have been described above in the first embodiment, a duplicate description will be omitted.

The at least one camera device 100 is disposed to acquire a captured image of the illegal parking/stopping area of the road 13. In particular, the at least one camera device 100 may be positioned at a starting point of the illegal parking/ stopping area to capture a vehicle entering the illegal parking/stopping area (hereinafter, the image thus acquired will be referred to as an "entering vehicle captured image"). In addition, the at least one camera device 100) may be positioned at an ending point of the illegal parking/stopping area to capture a vehicle exiting the illegal parking/stopping area (hereinafter, the image thus acquired will be referred to as an "exiting vehicle captured image"). In addition, the at least one camera device 100 may be positioned at any point within the illegal parking/stopping area to capture a vehicle that has just stopped in the illegal parking/stopping area (hereinafter, the image thus acquired will be referred to as a "stopped vehicle captured image"). The camera device 100 will be described in more detail below.

The monitoring apparatus 200 (or a server device) may receive captured images from the at least one camera device 100 and analyze the received captured images to determine whether a vehicle 11*a*, 11*b* or 11*c* illegally parked/stopped in an illegal parking/stopping area exists. At this time, using an object detection algorithm, the monitoring apparatus 200 may detect vehicle object information from the captured images. The vehicle object information may include at least two of the exterior shape, color, and size of the vehicle, and may further include license plate information of the vehicle. The monitoring apparatus 200 may detect the vehicle object information from at least two captured images from among the entering vehicle captured image, the exiting vehicle captured image, and the stopped vehicle captured image, and compare them to determine whether there is an illegally parked/stopped vehicle. In addition, the monitoring apparatus 200 may use a timer to determine whether there is an illegally parked/stopped vehicle, and may set a predefined time that serves as a criterion for determining illegal parking/stopping. The monitoring apparatus 200 will be described in more detail below.

The user terminal 300 may be a terminal of an administrator managing the road 13 or a supervisor monitoring illegal parking/stopping. Additionally, the user terminal 300 may be a portable terminal carried by a driver of an illegally parked/stopped vehicle. The user terminal 300 may include a terminal communication circuit capable of communicating with the monitoring apparatus 200 via the network 50, a terminal display capable of outputting information or a message received from the monitoring apparatus 200, a terminal memory capable of storing the information or message received from the monitoring apparatus 200, and a terminal processor that controls the above components and operations of the user terminal 300. The user terminal 300 may receive information on an illegally parked/stopped vehicle or an illegal parking/stopping warning message from the monitoring apparatus 200 and may output the received information or message on the terminal display.

The network 50 may support the formation of a communication channel among the at least one camera device 100, the monitoring apparatus 200, and the user terminal 300. The network 50 may include, for example, a communication element that supports a wired connection or a wireless connection between at least two of the camera device 100, the monitoring apparatus 200, and the user terminal 300. In an example, the network 50 may wirelessly connect between the camera device 100 and the monitoring apparatus 200 or between the monitoring apparatus 200 and the user terminal 300. In this regard, the network 50 may include at least one base station and a base station controller. The network 50 is not limited to a specific communication scheme (or communication generation), and may include communication equipment that supports at least one of various communication schemes for signal flow among the camera device 100, the monitoring apparatus 200, and the user terminal 300.

Figure 8:
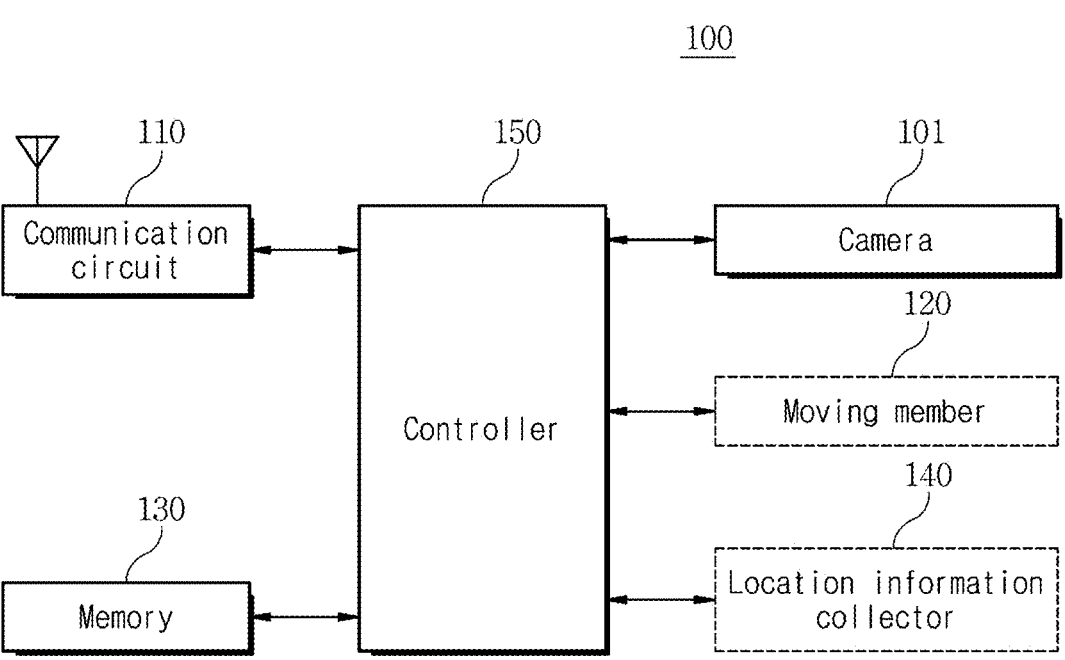
FIG. 8 is a block diagram illustrating the configuration of a camera device according to the second embodiment of the present disclosure.

FIG. 8 is a block diagram illustrating the configuration of a camera device according to the second embodiment of the present disclosure.

Referring to FIG. 8, the camera device 100 of the second embodiment may include a camera 101, a communication circuit 110, a memory 130, and a controller 150. Additionally, if the camera device 100 is a movable camera device as in the first embodiment, it may further include a moving member 120 and a location information collector 140.

The camera 101 may include an image sensor or a CCTV camera that can be installed on the camera device 100. In addition, the camera 101 may have a zoom function. Additionally, the camera 101 may further include a module that can rotate. For example, the camera 101 may include a rotation module that can rotate the shooting direction up, down, left, and right. The camera 101 may capture a wide-area image of a designated parking/stopping area on the road 13 under the control of the controller 150 or may selectively capture an image of a specific vehicle located in the parking/stopping area. The camera 101 may capture still images and/or moving images of the parking/stopping area and/or a specific vehicle.

In this embodiment, the camera 101 may be disposed to capture a starting point (or vehicle entry point) of an illegal parking/stopping area, an ending point (or vehicle exit point) of the illegal parking/stopping area, and at least one intermediate point between the starting point and the ending point. In this case, one camera 101 may capture all of the starting point, the ending point, and the intermediate point(s) while rotating or moving, or two or more cameras 101 may capture some of the starting point, the ending point, and the intermediate point(s), respectively.

The communication circuit 110, the moving member 120, the memory 130, and the location information collector 140 are substantially the same as the corresponding components of the first embodiment described above, so a description of them is omitted.

The controller 150 may perform transmission and processing of signals related to the control of the camera device 100 and storage or transmission of the processing results. In an example, the controller 150 may control the communication circuit 110 according to predefined scheduling information or in response to a request from the monitoring apparatus 200 to receive location and time information on the illegal parking/stopping area, and store the received information in the memory 130. Alternatively, the information on the illegal parking/stopping area may be entered by an administrator who manages the camera device 100.

In addition, the controller 150 may control the camera 101 to collect images of the illegal parking/stopping area according to the illegal parking/stopping area information stored in the memory 130. For example, the controller 150 may control the camera 101 to collect the entering vehicle captured image at the starting point (or the vehicle entry point) of the illegal parking/stopping area, the exiting vehicle captured image at the ending point (or the vehicle exit point) of the illegal parking/stopping area, and/or the stopped vehicle captured image at an intermediate point between the starting point and the ending point. The controller 150 may provide the collected images to the monitoring apparatus 200.

Figure 9:
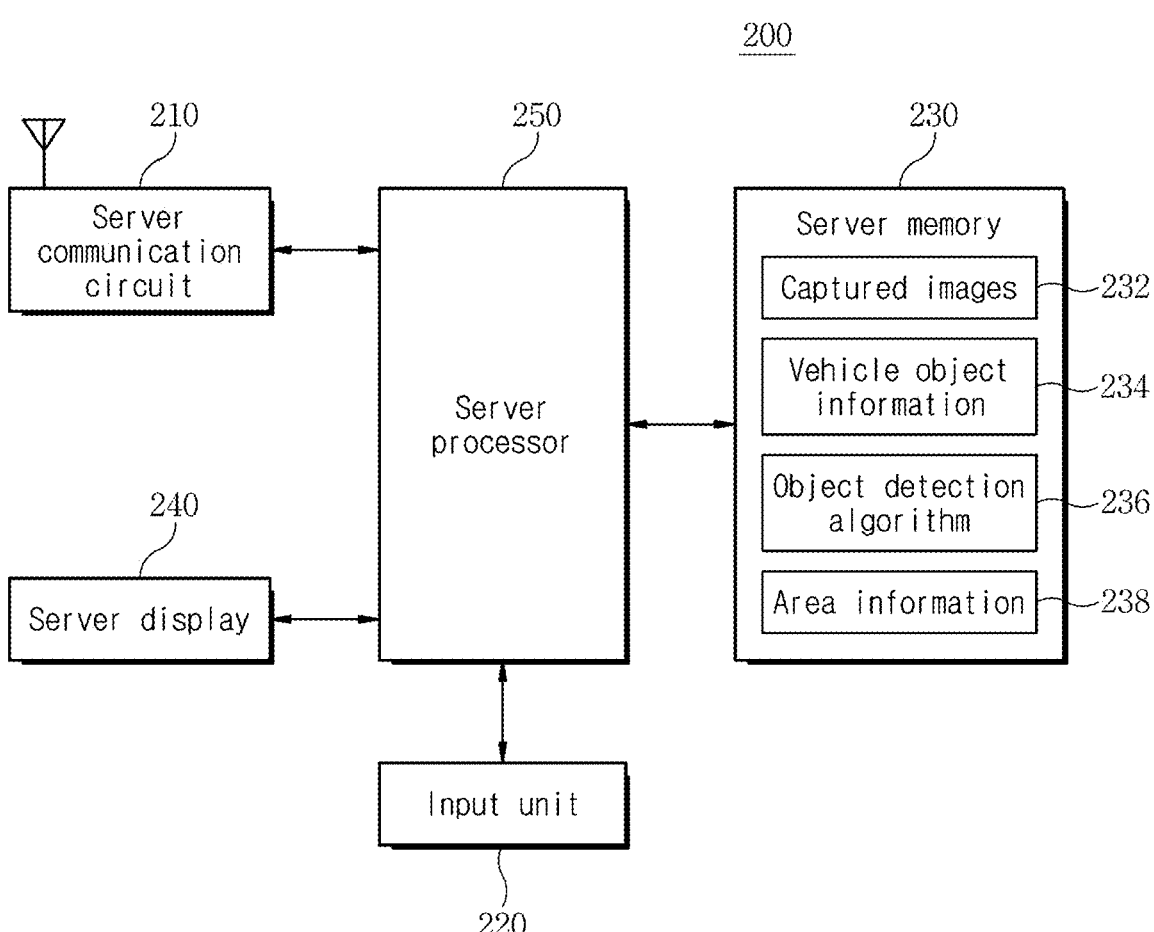
FIG. 9 is a block diagram illustrating the configuration of an illegally parked/stopped vehicle monitoring apparatus according to the second embodiment of the present disclosure.

FIG. 9 is a block diagram illustrating the configuration of an illegally parked/stopped vehicle monitoring apparatus according to the second embodiment of the present disclosure.

Referring to FIG. 9, the monitoring apparatus 200 (or a server device) may include a server communication circuit 210, an input unit 220, a server memory 230, a server display 240, and a server processor 250. In the example of FIG. 9, the monitoring apparatus 200 is described as a separate component from the above-described camera device 100, but in another example, the monitoring apparatus 200 may be implemented as an integration with the camera device 100.

Since the server communication circuit 210, the input unit 220, and the sever display 240 are substantially the same as the corresponding components of the first embodiment described above, a description thereof is omitted.

The server memory 230 may store at least one of data and programs related to the operation of the monitoring apparatus 200. For example, the server memory 230 may store captured images 232, vehicle object information 234, object detection algorithm 236, and area information 238.

The captured images 232 are received from the at least one camera device 100. For example, the captured images 232 may include the entering vehicle captured image received from the camera device 100 disposed at the starting point of the illegal parking/stopping area, the exiting vehicle captured image received from the camera device 100 disposed at the ending point of the illegal parking/stopping area, and/or the stopped vehicle captured image(s) received from the camera device(s) 100 disposed at any point(s) within the illegal parking/stopping area.

The vehicle object information 234 is information about a vehicle object detected from the captured images 232 using the object detection algorithm 236. The vehicle object information 234 may include at least two of the exterior shape, color, and size of the vehicle. In addition, the vehicle object information 234 may further include license plate information of the vehicle. In addition, the vehicle object information 234 may include information about an illegally parked/stopped vehicle determined by the server processor 250 described below.

The object detection algorithm 236 is an algorithm or program that can recognize and detect a vehicle from the captured images 232.

The area information 238 may include information on an illegal parking/stopping area where at least one of time and location changes. The area information 238 may be provided to the at least one camera device 100 that can move under the control of the server processor 250.

The server processor 250 may perform operations of receiving, transmitting, and processing signals related to the operation of the monitoring apparatus 200, and storing or transmitting the processing results. For example, the server processor 250 may control the server communication circuit 210 to receive the captured images 232 from the at least one camera device 100 based on predefined scheduling information or in response to an administrator's input, and analyze the received captured images 232 to determine whether there is an illegally parked/stopped vehicle. Additionally, the server processor 250 may perform processing for a warning when an illegally parked/stopped vehicle is detected. In this regard, the server processor 250 may include a configuration as illustrated in FIG. 10.

Figure 10:
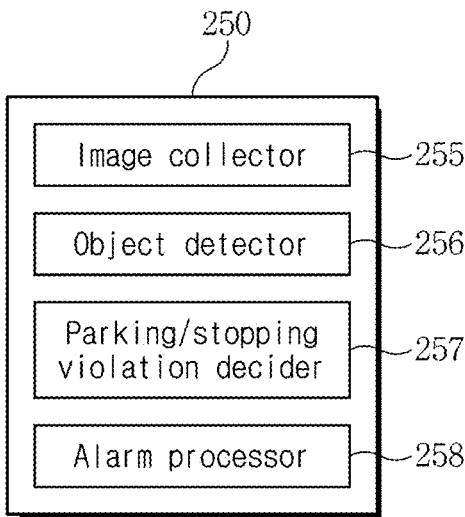
FIG. 10 is a block diagram illustrating the configuration of a server processor in the monitoring apparatus illustrated in FIG. 9.

FIG. 10 is a block diagram illustrating the configuration of a server processor in the monitoring apparatus illustrated in FIG. 9.

Referring to FIG. 10, the server processor 250 may include an image collector 255, an object detector 256, a parking/stopping violation decider 257, and an alarm processor 258.

The image collector 255 may generate a control signal related to controlling the camera device 100 and transmit the generated control signal to the camera device 100 via the network 50. In an example, if the camera device 100 is a movable camera device, the image collector 255 may provide the area information 238 to the camera device 100 to collect captured images of an illegal parking/stopping area corresponding to the area information 238. In addition, the image collector 255 may classify captured images 232 received from the camera device 100 according to certain conditions and store them in the server memory 230. For example, the image collector 255 may classify and store the captured images 232 into the entering vehicle captured image received from the camera device 100 placed at the starting point (or vehicle entry point) of the illegal parking/ stopping area, the exiting vehicle captured image received from the camera device 100 placed at the ending point (or vehicle exit point) of the illegal parking/stopping area, and/or the stopped vehicle captured image(s) received from the camera device(s) 100 placed at any point(s) within the illegal parking/stopping area. The image collector 255 may transmit at least some of the classified captured images 232 to the object detector 256.

The object detector 256 may perform vehicle object detection on the captured images 232 received from the image collector 255 and store the information 234 about the detected vehicle objects in the server memory 230. For example, the object detector 256 may detect at least two of the exterior shape, color, and size of the vehicle from each of the entering vehicle captured image, the exiting vehicle captured image, and the stopped vehicle captured image. In addition, the object detector 256 may further detect license plate information from the captured images. If the license plate detection fails because the license plate is hidden, the object detector 256 may generate marking information indicating that the license plate is hidden. Detection of the vehicle object information 234 by the object detector 256 may vary depending on the conditions set for the illegal parking/stopping area.

After the image collector 255 collects the captured images for the illegal parking/stopping area and the object detector 256 performs the vehicle object detection on the collected captured images, the parking/stopping violation decider 257 determines whether a vehicle is illegally parked/stopped based on the vehicle object information.

In one example, the parking/stopping violation decider 257 may compare the vehicle object information between the stopped vehicle captured image of a vehicle stopped at any point in the illegal parking/stopping area and the exiting vehicle captured image of a vehicle exiting the ending point of the illegal parking/stopping area after a specified period of time. If there is a vehicle with the same vehicle object information, the parking/stopping violation decider 257 may decide the vehicle as an illegally parked/stopped vehicle.

In another example, the parking/stopping violation decider 257 may compare the vehicle object information between the first and second captured images captured at a certain point in the illegal parking/stopping area at a time interval. If there is a vehicle with the same vehicle object information, the parking/stopping violation decider 257 may decide the vehicle as an illegally parked/stopped vehicle.

In still another example, the parking/stopping violation decider 257 may compare the vehicle object information between the entering vehicle captured image of a vehicle entering the starting point of the illegal parking/stopping area and the exiting vehicle captured image of a vehicle exiting from the ending point of the illegal parking/stopping area. If there is a vehicle with the same vehicle object information, the parking/stopping violation decider 257 may decide the vehicle as an illegally parked/stopped vehicle.

The alarm processor 254 may receive information on illegally parked/stopped vehicles from the parking/stopping violation detector 253. If there is an illegally parked/stopped vehicle, the alarm processor 254 may create a message about the illegal parking/stopping and transmit it to the user terminal 300 (e.g., a user terminal of an administrator who manages the road 13). In an example, the alarm processor 254 may create a warning message about illegal parking/ stopping and transmit the warning message in a broadcast manner through a base station adjacent to the road 13 where the vehicle is parked/stopped. Alternatively, the alarm processor 254 may provide a warning message about an illegally parked/stopped vehicle to the camera device 100 so that the camera device 100 can output the warning message through an audio device or a display. Alternatively, the alarm processor 254 may collect the phone number of the user terminal 300 registered with the license plate number of the illegally parked/stopped vehicle, and provide at least one of an illegal parking/stopping warning message, a ticket issuance guidance message for illegal parking/stopping, or an illegally parked/stopped vehicle towing guidance message to the corresponding phone number.

Figure 11:
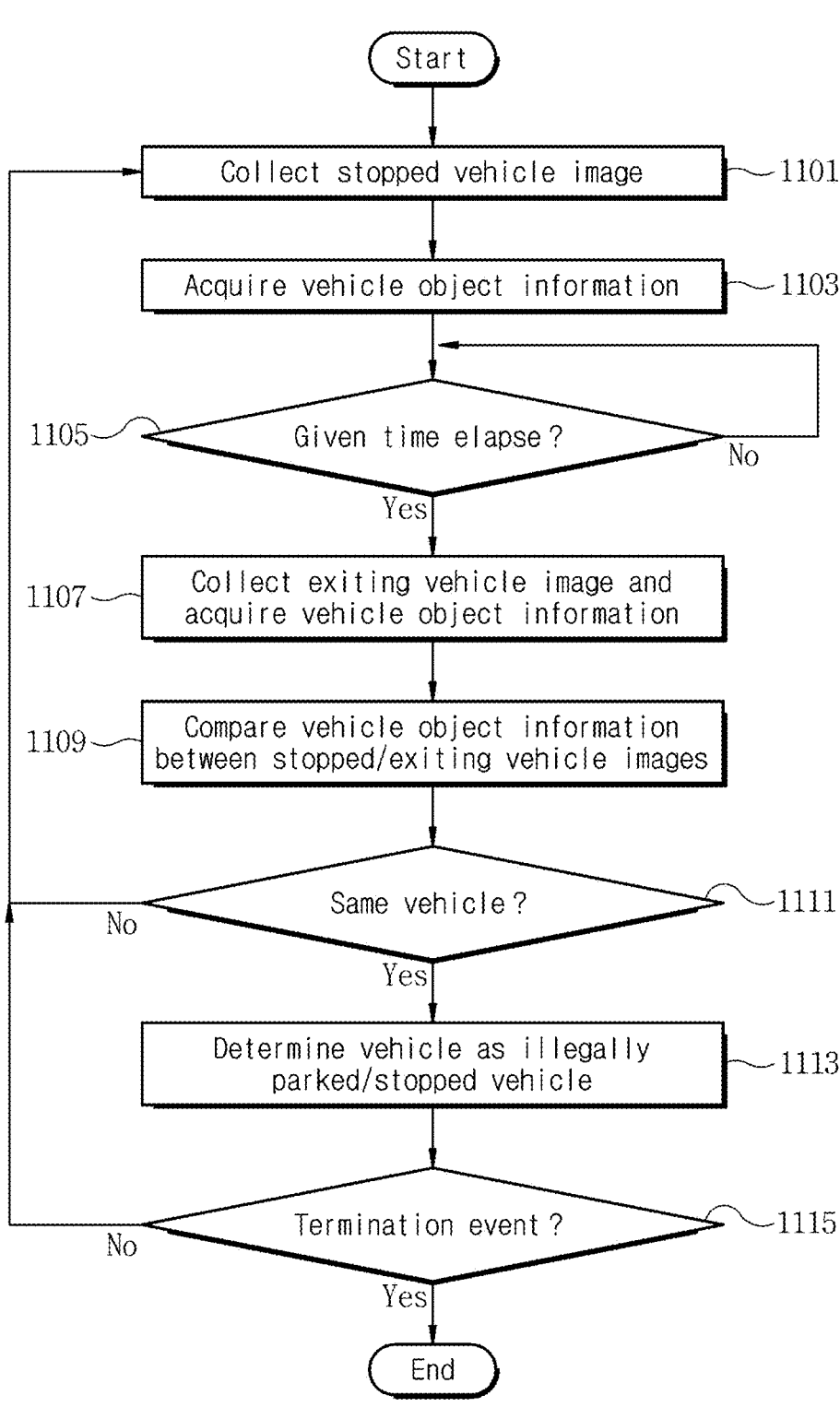
FIG. 11 is a flowchart illustrating an example of an illegally parked/stopped vehicle monitoring method according to the second embodiment of the present disclosure.

FIG. 11 is a flowchart illustrating an example of an illegally parked/stopped vehicle monitoring method according to the second embodiment of the present disclosure. The illegally parked/stopped vehicle monitoring method shown in FIG. 11 can be performed by the server processor 250 of the monitoring apparatus 200.

Referring to FIG. 11, in step 1101, the server processor 250 collects stopped vehicle captured images at a certain point in an illegally parked/stopped area. For example, if the at least one camera device 100 captures an image of a vehicle that has just stopped at any point in the illegally parked/stopped area and transmits the captured image, the server processor 250 may collect it as the stopped vehicle captured image.

In step 1103, the server processor 250 performs vehicle object detection by applying the object detection algorithm 236 to the collected stopped vehicle captured image and thereby acquires vehicle object information. The acquired vehicle object information may be at least two of the exterior shape, color, and size of the vehicle. For example, the acquired vehicle object information may be the exterior shape and color of the vehicle, or the color and size of the vehicle, or the exterior shape and size of the vehicle, or all of the exterior shape, color, and size of the vehicle. The acquired vehicle object information may further include license plate information of the vehicle.

In step 1105, the server processor 250 starts a timer and checks whether a given time has elapsed. At this time, the given time is a reference time for determining whether there is illegal parking/stopping.

When the given time has elapsed, in step 1107, the server processor 250 collects exiting vehicle captured images. For example, if the at least one camera device 100 captures an image of a vehicle exiting from the ending point of the illegal parking/stopping are and transmits the captured image, the server processor 250 may collect it as the exiting vehicle captured image. In addition, in the step 1107, the server processor 250 performs vehicle object detection by applying the object detection algorithm 236 to the collected exiting vehicle captured image and thereby acquires vehicle object information. The acquired vehicle object information may include at least two of the exterior shape, color, and size of the vehicle, and may further include license plate information of the vehicle.

In step 1109, the server processor 250 compares the vehicle object information acquired from the stopped vehicle captured image of the step 1103 with the vehicle object information acquired from the exiting vehicle captured image of the step 1107. For example, depending on the acquired vehicle object information, the server processor 250 may compare the exterior shape and color of the vehicle, or the color and size of the vehicle, or the exterior shape and size of the vehicle, or all of the exterior shape, color, and size of the vehicle.

In step 1111, the server processor 250 determines whether there is a vehicle with the same vehicle object information. That is, through the vehicle object information comparison result of the step 1109, the server processor 250 may determine whether there is a vehicle with the same vehicle object information in the stopped vehicle captured image and the exiting vehicle captured image.

If there is no vehicle with the same vehicle object information in the step 1111, the server processor 250 may return to the step 1101 and perform the subsequent operations again.

If there is a vehicle with the same vehicle object information in the step 1111, the server processor 250 determines the vehicle as an illegally parked/stopped vehicle in step 1113. At this time, the server processor 250 may take follow-up measures for the illegally parked/stopped vehicle. For example, the server processor 250 may obtain the phone number registered by the vehicle owner based on the vehicle license plate information in the vehicle object information and send a warning message to the vehicle owner's user terminal.

In step 1115, the server processor 250 may check whether to terminate the illegal parking/stopping monitoring process.

If there is no separate process termination event, the server processor 250 may return to the step 1101 and perform the subsequent operations again.

As described above, in the illegally parked/stopped vehicle monitoring method according to one example of the second embodiment, when a vehicle that has entered the illegally parked/stopped area stops, a captured image is collected, and when the vehicle exits after a specified period of time, a captured image is collected again to determine whether the vehicle is illegally parked/stopped. According to the monitoring method of this example, it is possible to detect an illegally parked/stopped vehicle by identifying whether a certain vehicle is the same vehicle through information such as the exterior shape, color, and size of the vehicle without directly recognizing the vehicle's license plate. In addition, even though the license plate is intentionally covered and recognition is impossible when recognizing the license plate of a stopped vehicle, the vehicle may be marked and then its license plate can be recognized again when it exits the illegally parked/stopped area. In this case, additional penalty points or demerit points may be imposed on the vehicle.

Figure 12:
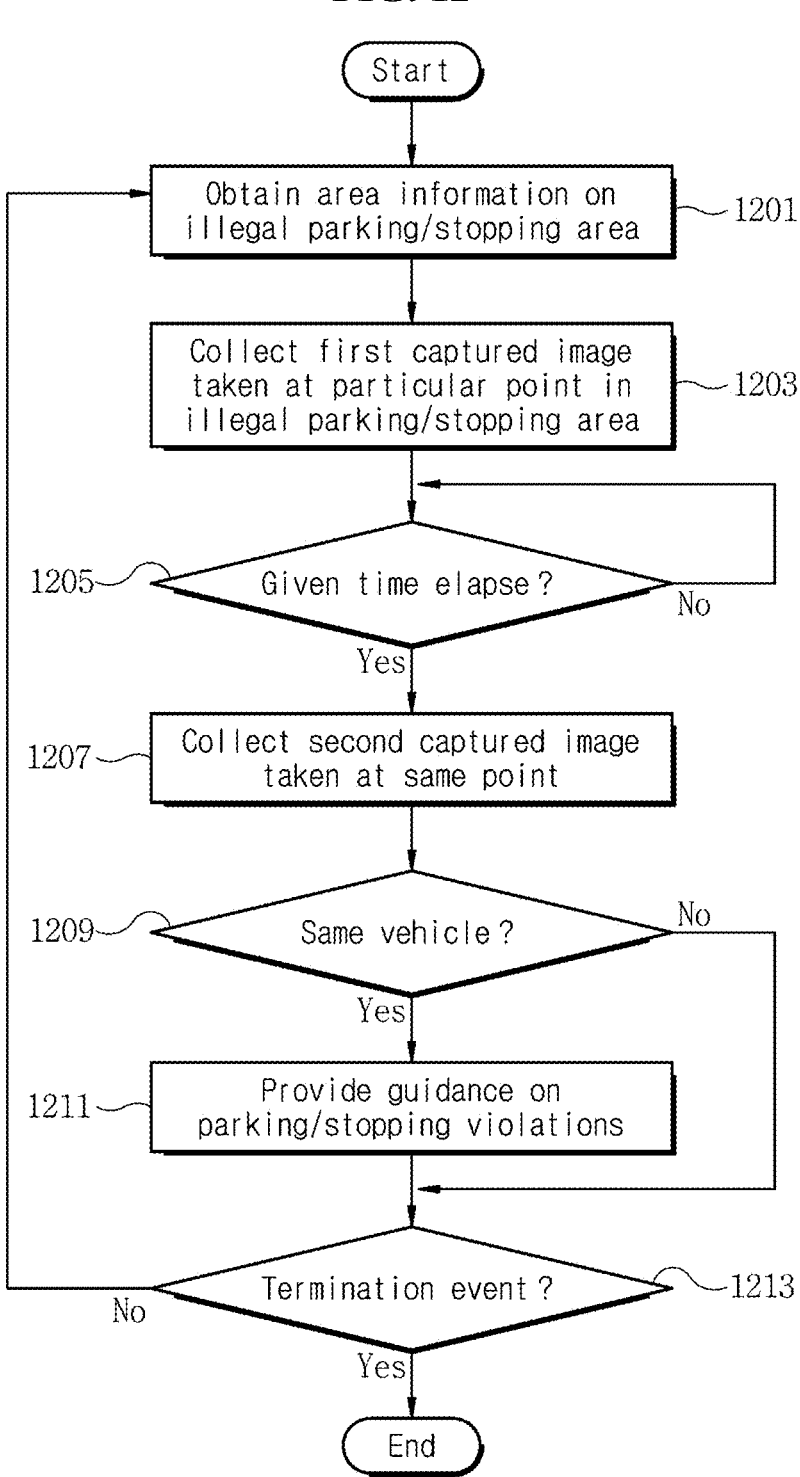
FIG. 12 is a flowchart illustrating another example of an illegally parked/stopped vehicle monitoring method according to the second embodiment of the present disclosure.

FIG. 12 is a flowchart illustrating another example of an illegally parked/stopped vehicle monitoring method according to the second embodiment of the present disclosure. The illegally parked/stopped vehicle monitoring method shown in FIG. 12 can be performed by the server processor 250 of the monitoring apparatus 200.

Referring to FIG. 12, in step 1201, the server processor 250 may obtain the area information 238 about the illegal parking/stopping area. In some cases, some illegal parking/stopping areas may be operated variably depending on time or settings. In this case, the server processor 250 may the area information 238 to identify information about the illegal parking/stopping area. For example, the area information 238 may be received from a server device of a relevant public institution, or may be obtained by input from an administrator. If the illegal parking/stopping area is not operated variably, the step 1201 may not be necessary.

In step 1203, the server processor 250 collects first captured images taken at a predetermined location in the illegal parking/stopping area. For example, the server processor 250 may receive the first captured images by requesting them from the camera device 100 at the corresponding location. In another example, the camera device 100 may transmit the first captured images to the server processor 250 whenever vehicles enter the corresponding location. In still another example, the camera device 100 may transmit the first captured images periodically to the server processor 250.

In step 1205, the server processor 250 checks whether a given time has elapsed. If the given time has elapsed, the server processor 250 collects second captured images taken at the same point in step 1207. That is, if a predetermined time has elapsed after the server processor 250 acquires the first captured image for a certain point in the illegal parking/stopping area in the step 1203, the server processor 250 acquires the second captured image for the same point in the step 1205.

In step 1209, the server processor 250 performs vehicle object detection by applying the object detection algorithm 236 to each of the first and second captured images and thereby acquires vehicle object information. The acquired vehicle object information may include at least two of the exterior shape, color, and size of the vehicle, and may further include license plate information of the vehicle. Subsequently, the server processor 250 compares the vehicle object information (e.g., at least two of the exterior shape, color, and size of the vehicle) between the first and second captured images and thereby identifies whether a vehicle having the same vehicle object information exists.

If there is an identical vehicle, the server processor 250 determines the vehicle as an illegally parked/stopped vehicle and performs a parking/stopping prohibition guidance in step 1211. If there is no identical vehicle, the server processor 250 may skip the step 1211.

In step 1213, the server processor 250 may check whether to terminate the illegal parking/stopping monitoring process. If there is no separate process termination event, the server processor 250 may return to the step 1201 and perform the subsequent operations again.

Meanwhile, a modified example of the monitoring method shown in FIG. 12 is also possible as follows.

The server processor 250 collects the entering vehicle captured image from the starting point (or vehicle entry point) of the illegal parking/stopping area in the step 1203, and collects the exiting vehicle captured image from the ending point (or vehicle exit point) of the illegal parking/stopping area in the step 1207. At this time, the aforementioned step 1205 is omitted.

Next, in the step 1209, the server processor 250 acquires and compares the vehicle object information from the entering vehicle captured image and the exiting vehicle captured image to check whether there is an identical vehicle.

If there is an identical vehicle, the server processor 250 determines whether a time between the time of collecting the entering vehicle captured image and the time of collecting the exiting vehicle captured image exceeds a predefined time, and if so, determines the vehicle as an illegally parked/stopped vehicle.

While the description contains many specific implementation details, these should not be construed as limitations on the scope of the present disclosure or of what may be claimed, but rather as descriptions of features that may be specific to particular embodiments of particular disclosure.

Also, although the description describes that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

The description shows the best mode of the present disclosure and provides examples to illustrate the present disclosure and to enable a person skilled in the art to make and use the present disclosure. The present disclosure is not limited by the specific terms used herein. Based on the above-described embodiments, one of ordinary skill in the art can modify, alter, or change the embodiments without departing from the scope of the present disclosure.

Accordingly, the scope of the present disclosure should not be limited by the described embodiments and should be defined by the appended claims.

What is claimed is:

1. An apparatus for monitoring illegally parked/stopped vehicles, the apparatus comprising:
   a server communication circuit; and a server processor functionally connected to the server communication circuit, the server processor configured to:
      receive location information of a plurality of parking/stopping monitoring areas,
      generate a patrol route for a movable camera device to collect captured images based on the location information of the parking/stopping monitoring areas,
      in relation to generating the patrol route, group the plurality of parking/stopping monitoring areas according to a number of the movable camera devices,
      provide the patrol route to the movable camera device,
      receive, from the movable camera device, first captured images of the parking/stopping monitoring areas included in the patrol route and second captured images of the parking/stopping monitoring areas after a specified time has elapsed, and
      determine that a vehicle commonly detected in the first and second captured images is an illegally parked/stopped vehicle.

2. The apparatus of claim 1, wherein the server processor is configured to:
   in relation to generating the patrol route, identify a current location of the movable camera device and select the parking/stopping monitoring area closest to the current location of the movable camera device as a parking/stopping monitoring start area of the patrol route.

3. The apparatus of claim 2, wherein the server processor is configured to:
   in relation to generating the patrol route, add other parking/stopping monitoring area to the patrol route within the specified time that allows return to the parking/stopping monitoring start area after the first captured image is collected from the parking/stopping monitoring start area.

4. The apparatus of claim 3, wherein the server processor is configured to:
   if there is at least one remaining parking/stopping monitoring area that is not included in the patrol route among the plurality of parking/stopping monitoring areas, select a specific parking/stopping monitoring area from among the at least one remaining parking/stopping monitoring area and generate another patrol route that includes the specific parking/stopping monitoring area.

5. The apparatus of claim 2, wherein the specified time includes a maximum parking/stopping possible time set in the parking/stopping monitoring start area.

6. The apparatus of claim 1, wherein the server processor is configured to:
   obtain a vehicle number of the vehicle from the first captured images when collecting the first captured images, collect a phone number of a registered user terminal corresponding to the vehicle number, and send a warning message regarding the illegally parked/stopped vehicle to the user terminal based on the phone number.

7. A method for monitoring illegally parked/stopped vehicles, performed by a server processor of a monitoring apparatus, the method comprising:
   receiving location information of a plurality of parking/stopping monitoring areas;
   generating a patrol route for a movable camera device to collect captured images based on the location information of the parking/stopping monitoring areas;
   providing the patrol route to the movable camera device;

receiving, from the movable camera device, first captured images of the parking/stopping monitoring areas included in the patrol route and second captured images of the parking/stopping monitoring areas after a specified time has elapsed; and determining that a vehicle commonly detected in the first and second captured images is an illegally parked/stopped vehicle, wherein generating the patrol route includes:

grouping the plurality of parking/stopping monitoring areas according to a number of the movable camera devices.

8. The method of claim 7, wherein generating the patrol route includes:

identifying a current location of the movable camera device; and selecting the parking/stopping monitoring area closest to the current location of the movable camera device as a parking/stopping monitoring start area of the patrol route.

9. The method of claim 8, wherein generating the patrol route includes:

adding other parking/stopping monitoring area to the patrol route within the specified time that allows return to the parking/stopping monitoring start area after the first captured image is collected from the parking/stopping monitoring start area.

10. The method of claim 9, further comprising:

checking whether there is at least one remaining parking/stopping monitoring area that is not included in the patrol route among the plurality of parking/stopping monitoring areas;

if there is the at least one remaining parking/stopping monitoring area, selecting a specific parking/stopping monitoring area from among the at least one remaining parking/stopping monitoring area; and generating another patrol route that includes the specific parking/stopping monitoring area.

11. The method of claim 8, wherein the specified time includes a maximum parking/stopping possible time set in the parking/stopping monitoring start area.

12. The method of claim 7, further comprising:

obtaining a vehicle number of the vehicle from the first captured images when collecting the first captured images;

collecting a phone number of a registered user terminal corresponding to the vehicle number; and sending a warning message regarding the illegally parked/stopped vehicle to the user terminal based on the phone number.

\* \* \* \* \*